United States Patent [19]

Martin et al.

[11] Patent Number: 4,687,428
[45] Date of Patent: Aug. 18, 1987

[54] MANUFACTURE OF GLASS FIBRE TRUCK BODIES

[75] Inventors: Roger J. Martin; William C. McKee; Scott J. Vader; Frederick C. Seymour, all of Toronto, Canada

[73] Assignee: Unicell Limited, Toronto, Canada

[21] Appl. No.: 790,123

[22] Filed: Oct. 22, 1985

[51] Int. Cl.$^4$ ............................................. B29C 41/08
[52] U.S. Cl. ..................................... 425/60; 118/696; 118/698; 118/317; 156/556; 156/574; 264/309; 425/73; 425/88; 425/100; 425/123; 425/126 R; 425/375; 425/447; 425/470
[58] Field of Search ...................... 425/60, 88, 73, 100, 425/103, 117, 219, 375, 447, 470, 439, DIG. 239, 123, 126 R; 264/309; 118/317, 323, 696–698; 156/391, 556, 574, 71

[56] References Cited

U.S. PATENT DOCUMENTS

| 3,003,188 | 10/1961 | Weiss | 425/470 |
| 3,914,077 | 10/1975 | Lodes | 425/470 |
| 3,930,061 | 12/1975 | Scharfenberger | 264/309 |
| 4,048,956 | 9/1977 | Estebanez et al. | 118/323 |
| 4,123,414 | 10/1978 | Milette | 264/309 |
| 4,154,561 | 5/1979 | Virtanen | 425/470 |
| 4,205,031 | 5/1980 | Almquist et al. | 264/309 |

Primary Examiner—Jay H. Woo
Assistant Examiner—James C. Housel
Attorney, Agent, or Firm—Fetherstonhaugh & Co.

[57] ABSTRACT

A body manufacturing system for manufacturing bodies for vans, trailers, trucks and the like comprises; a molding station, a glass fibre applicator, a longitudinal guide associated with each mold for guiding the glass fibre applicator along the length of each mold, a transfer device adapted to support the applicator and transport it along said guide path from one mold to another, an insert locating device for inserting side wall, end wall and roof inserts into the molds, an extraction device for extracting the molded body from the mold in which it is formed, a trimming station, a transporter for transporting the molded bodies from the mold in which they are formed to said trimming station, trimming devices in said trimming station for trimming said body to the required proportions and contour, a floor locating system for locating a floor in the upwardly open end of the body located in the trimming station to form a finished body and a righting mechanism for supporting the molded body and operable to turn it right side up for mounting on a chassis of a vehicle.

19 Claims, 32 Drawing Figures

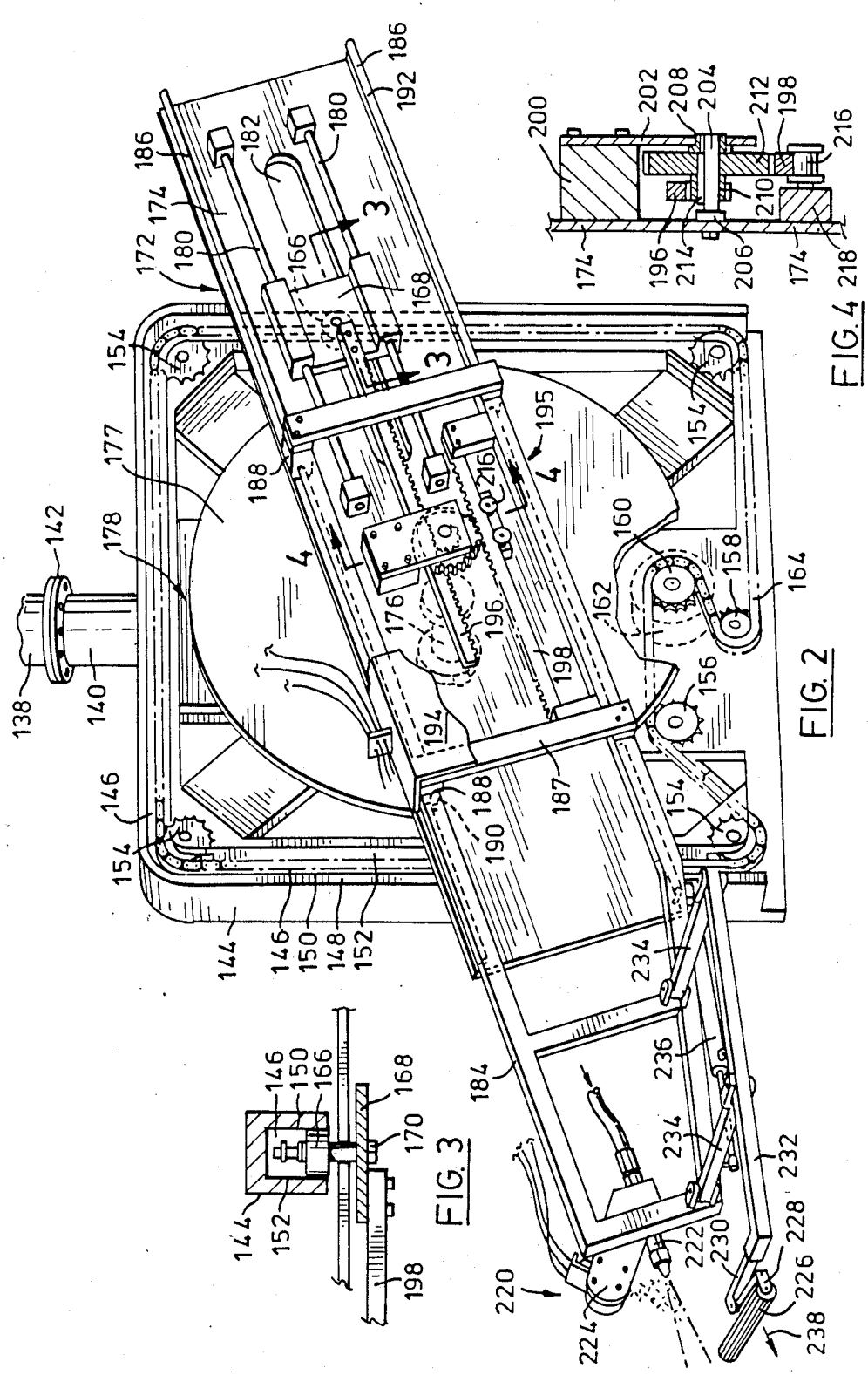

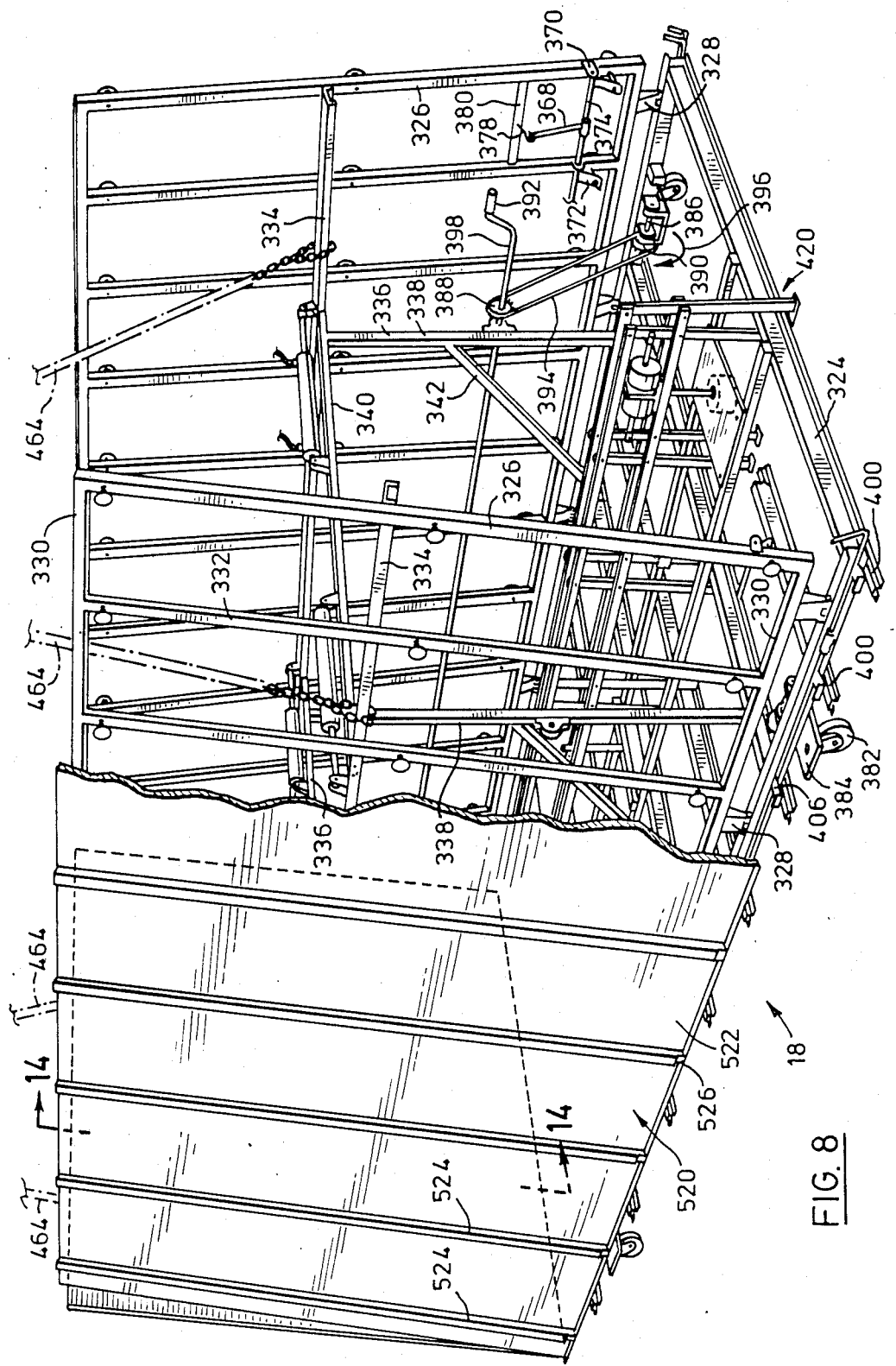

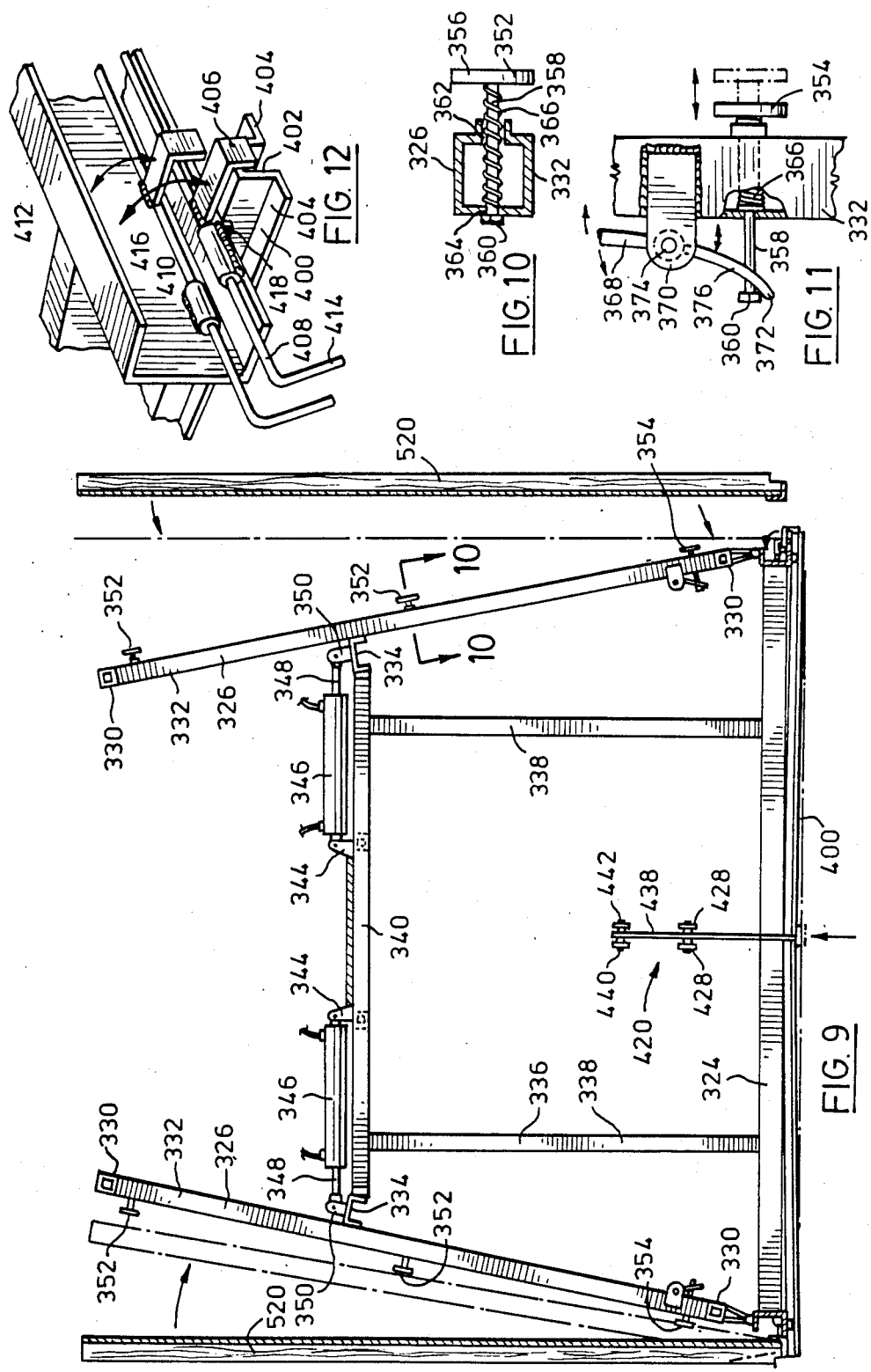

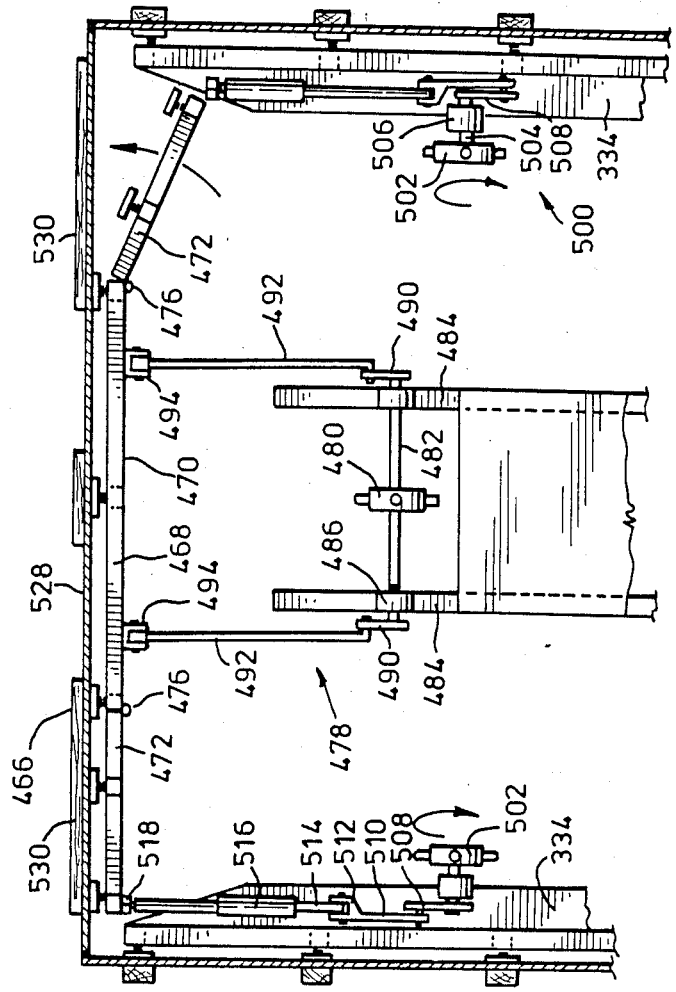
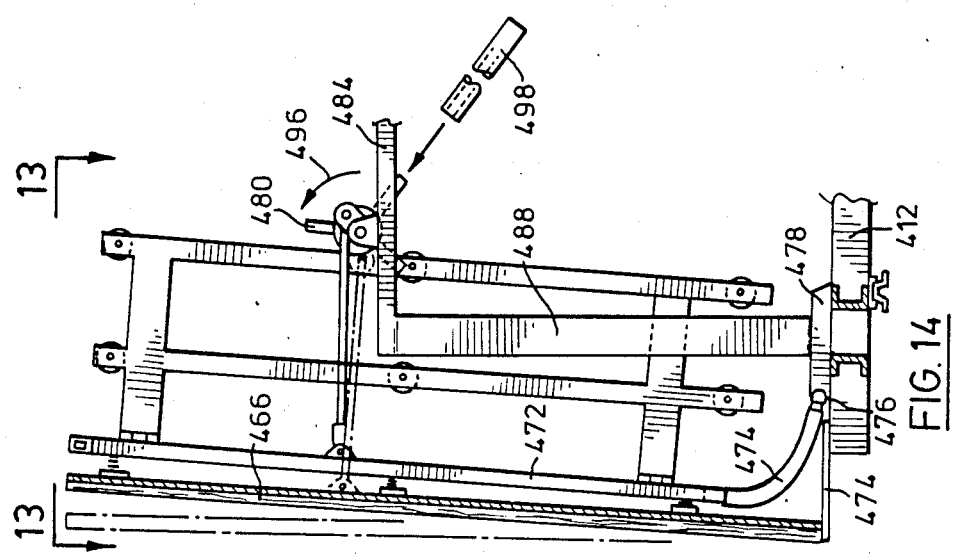

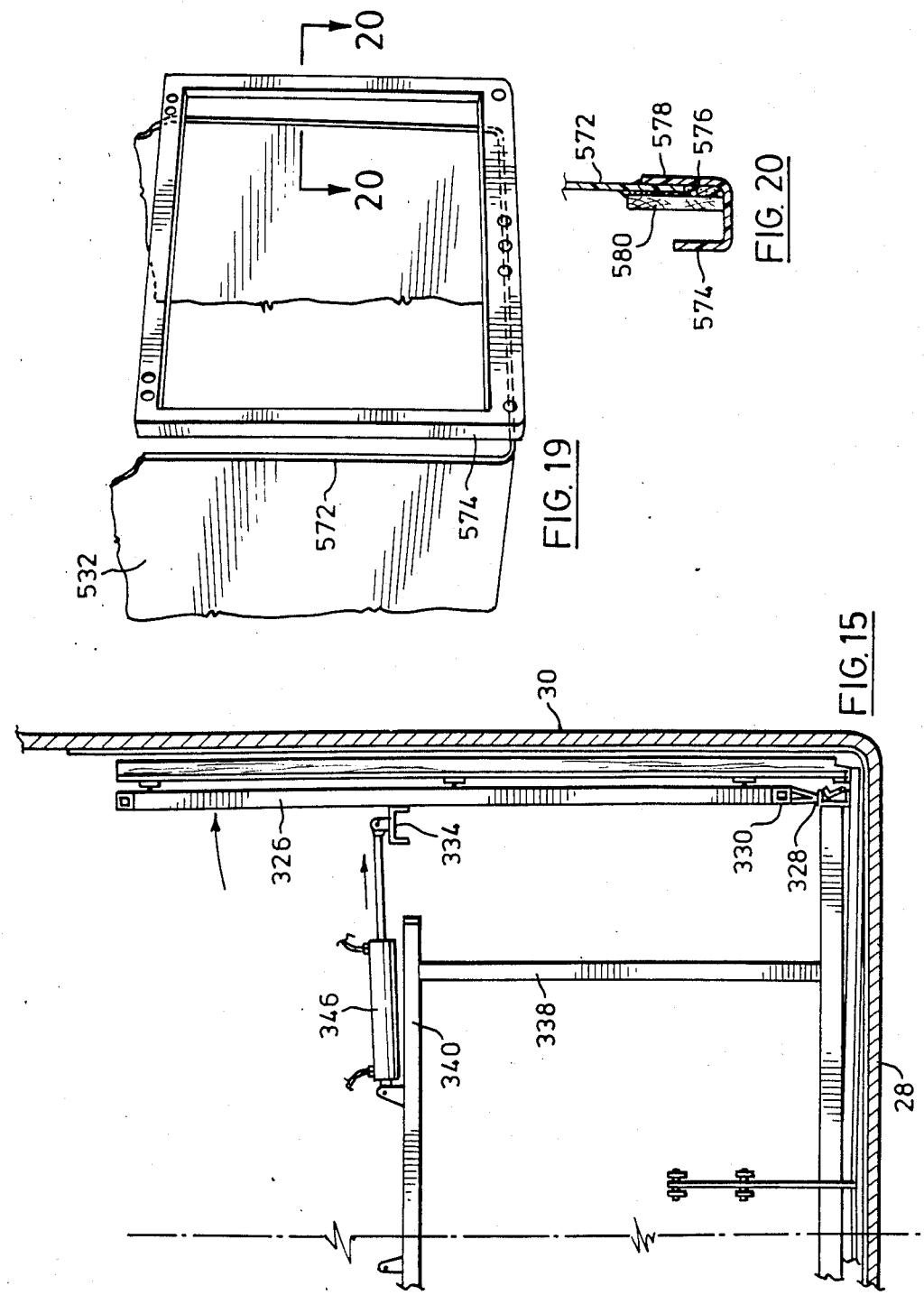

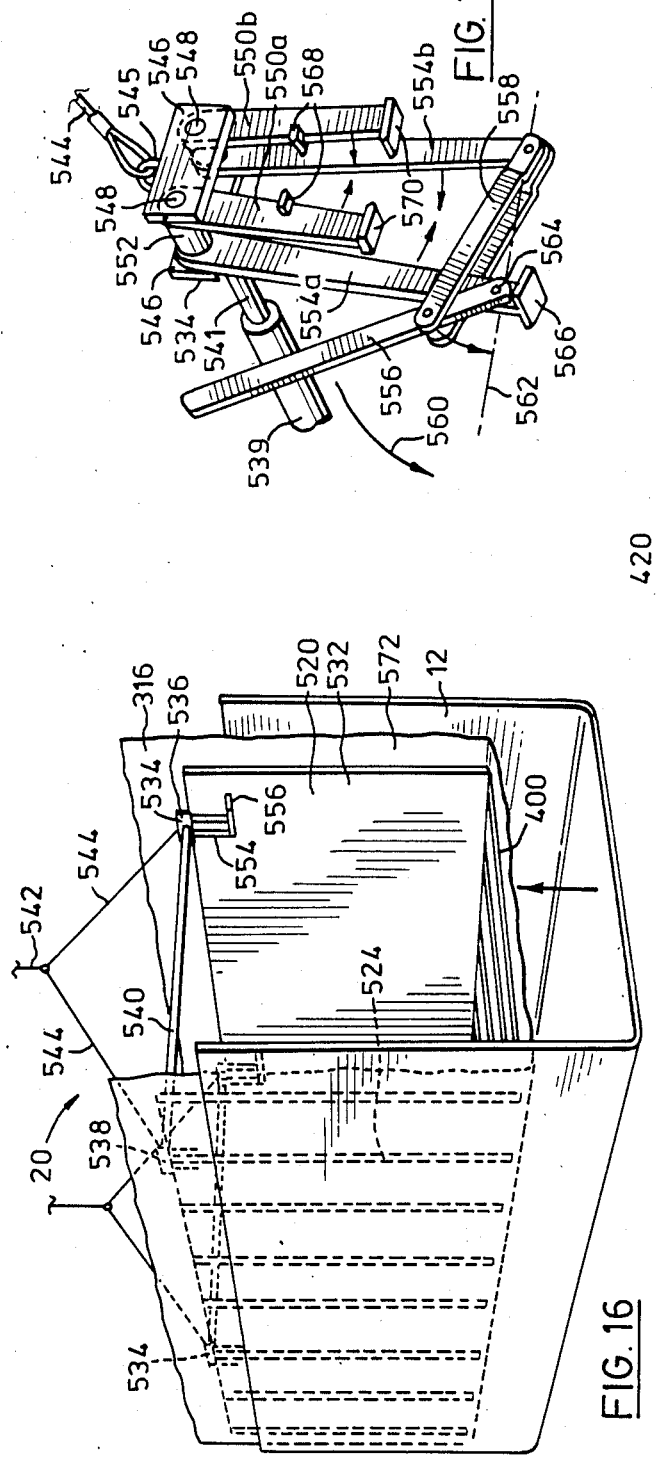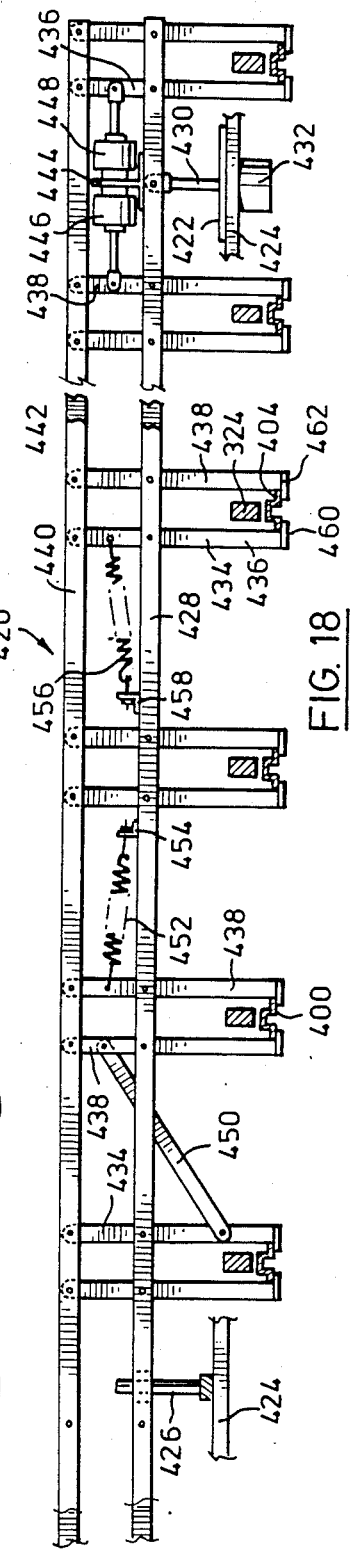

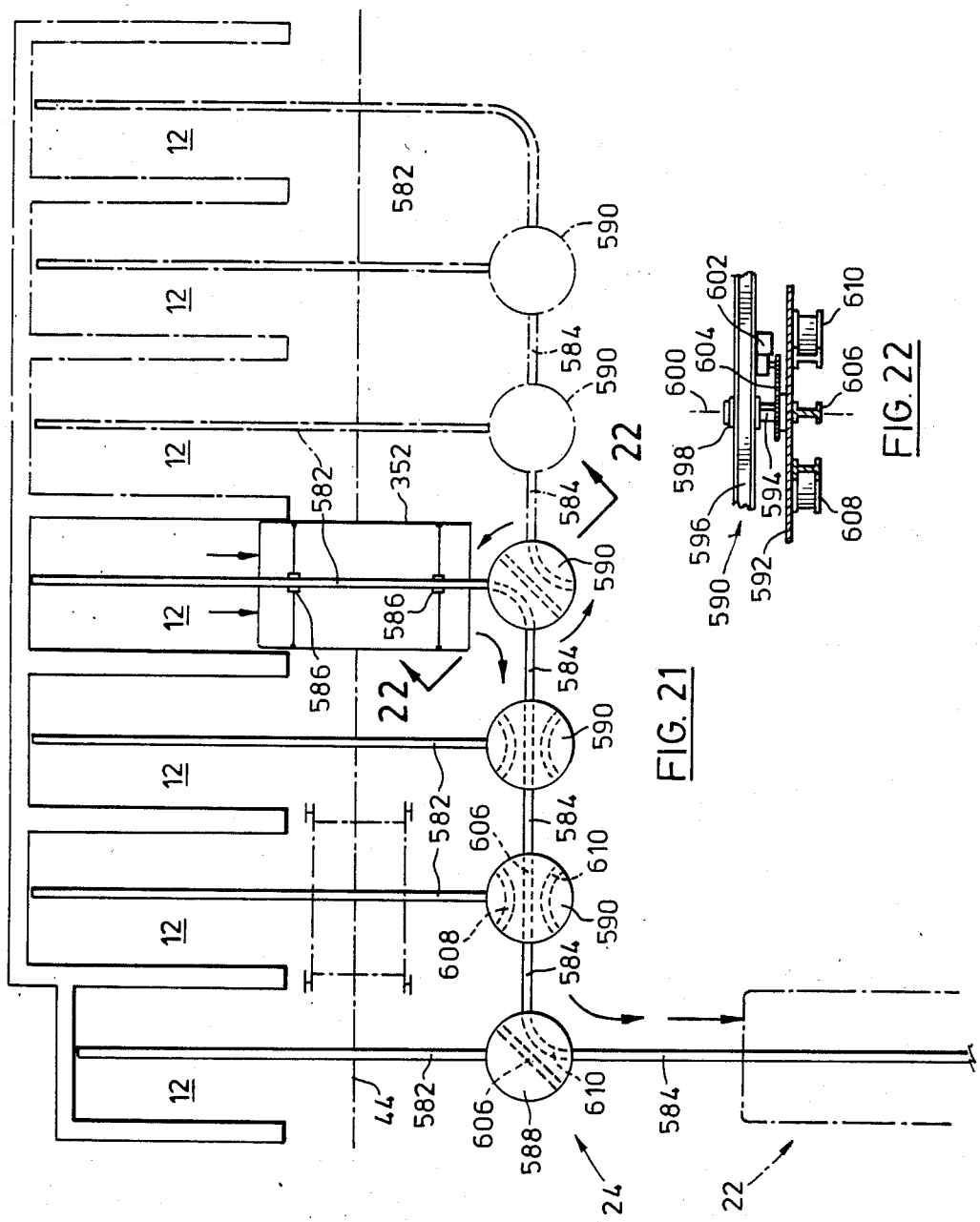

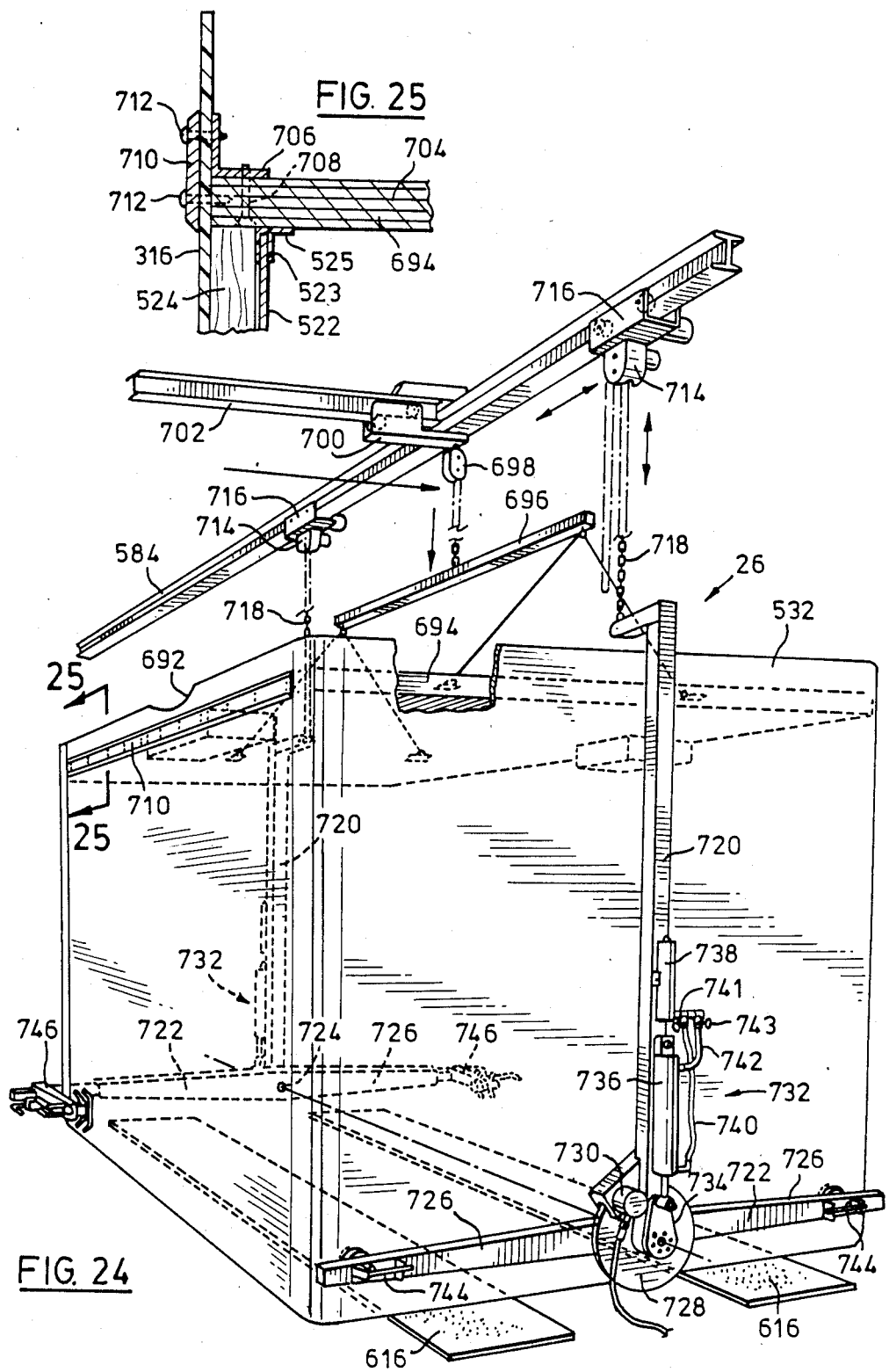

MANUFACTURE OF GLASS FIBRE TRUCK BODIES

FIELD OF THE INVENTION

This invention relates to the manufacture of bodies for vans, trailers, trucks and the like.

In particular, this invention relates to improvements in the apparatus and systems used in the manufacture of glass fibre reinforced bodies for vans, trailers, trucks and the like.

BACKGROUND OF THE INVENTION

The manufacture of glass fibre reinforced truck bodies is described in prior U.S. application Ser. No. 06/512,184 filed July 11, 1983 and assigned to the assignee of the present application.

The present invention relates to improvements in the apparatus described in the above application.

In the prior application, the guidance system which is used for guiding the movement of the work head about the U-shaped path includes a rack which extends around the U-shaped guide path and a pinion which is mounted on the turntable and travels along the rack. While this mechanism operates effectively to guide the work head in the required path, it has been found that this mechanism is subject to a substantial degree of wear.

This difficulty has been overcome by the mechanism of the present invention by employing a drive chain which is mounted on sprockets to follow the required U-shaped path and providing a reversible motor which drivingly engages the chain so as to move the chain in opposite directions as required to effect reversal of the direction of rotation of the turntable on which the workhead is mounted.

It has been found that the overall efficiency of the body manufacturing system can be greatly increased if a plurality of molds are provided in the molding station and the glass fibre applicator is moveable from one mold to the other to form glass fibre shells in each mold as required.

I have found that by providing a plurality of molds it is possible to ensure that the glass fibre applicator is utilized to its maximum extent while permitting a sufficient dwell time for each molded shell in each mold to permit it to be cured and to be fitted with an appropriate liner and to be removed from its mold.

To further increase efficiency, a trimming station is provided remote from each molding station and a conveyor system is provided for conveying the reinforced molded shells from each mold to the trimming station by providing the trimming station remote from the molds, it is possible to avoid contamination of the molds by the trimmings which are removed and to ensure maximum utilization of the molds for their primary purpose which is the forming of the shells and the fitting of the liners to the shells.

A further difficulty which has been experienced in attempting to provide a glass fibre applicator which can be transported from one mold to another is that it is necessary to provide power supply cables for supplying electrical and other power lines to the applicator. Difficulty has been experienced in attempting to avoid a situation where the power lines become fouled as a result of movement of the carriage on which the glass fibre applicator is mounted as the carriage moves from one mold to the other.

These difficulties have been overcome by providing a takeup means which will deploy and take up the power supply cable as the trolley moves toward and away from one end of the track on which it is mounted for movement between molds.

In processes for forming glass fibre reinforced plastic bodies where glass fibres are chopped, and sprayed together with a resin onto a mold, considerable difficulty has been experienced in attempting to provide a safe working environment for machine operators. It is necessary to extract the noxious fumes and glass fibre particles from the work station and difficulty has been experienced in attempting to achieve this objective in large open work areas such as the large molds required in the formation of truck bodies and the like.

In an attempt to provide an improved working environment there is provided a canopy for each mold. The canopies extend over and close the open top of its associated mold. An air extraction outlet is provided in the canopy at the closed end of the mold remote from the open end of the mold and an air extraction device communicates with the air extraction outlet of each canopy. In addition, a fresh air supply is provided which has outlets disposed opposite the open front end of each mold for directing a stream of fresh air into the front end of each mold to replace the contaminated air which is withdrawn by the extraction means in use.

In previous body manufacturing systems in which large glass fibre reinforced plastic bodies have been manufactured, it has been the practice to form the shell in a mold and and then manually insert reinforcing members.

It has been found that the efficiency of operation in the manufacture of glass fibre reinforced plastic bodies can be substantially increased if, following the forming of the shell in the mold, a liner is fitted to the shell with the aid of a liner inserter and after the liner has been secured to the shell, the assembly is then removed from the mold.

Because the liner must fit closely within the glass fibre reinforced plastic shell, difficulty was experienced in attempting to locate the liner in the shell when it is in the mold because the walls of the mold are substantially rigid.

To facilitate the location of the liner in the mold, there is provided a liner inserter which will support the side and end wall panels of the liner in a toed-in configuration which will facilitate the entry of the liner panels into the mold. In addition, the inserter will support the normally convex roof beams in a concave configuration prior to insertion into the mold. A jacking mechanism is provided for jacking the side and end panels of the liner into intimate contact with the walls of the shell and a release mechanism is provided for releasing the roof beams from their convex curvature so that they will extend into intimate contact with the bottom wall of the shell.

Considerable difficulty has been experienced in attempting to remove a glass fibre reinforced plastic body from a mold in which it is formed.

It has been found that a glass fibre reinforced plastic body with liners attached thereto can be removed from a mold by providing a stripper for stripping the body from the mold. The stripper includes clamps which can be clamped to opposite upper edge portions of the side panels of the liner and a suspension system which will transmit an inwardly and upwardly force to each clamp tending to draw the side walls of the molded body inwardly and upwardly to separate from the walls of the mold.

Glass fibre reinforced plastic bodies are usually made so as to be oversized when molded and it is necessary to trim the molded shells to the required configuration after molding.

In order to facilitate and expedite this trimming process, there is provided a trimming station in which trimming aids are located which include guides which can be secured to the shell which is to be trimmed so as to provide a trimming guide to facilitate the removal of access material. In addition, the trimming station provides a convenient location for installation of the floor of the body. Because the glass fibre body is in an upside-down configuration when it is molded and is maintained in this upside-down configuration when located in the trimming station, the floor can be mounted on the body when in the upside-down configuration merely by lowering the floor assembly into the open upper end of the molded body.

Because the method of manufacturing and assembling the body calls for the body to be maintained in an upside-down configuration until the floor has been fitted, it is necessary to turn the body right-side-up before it is fitted to a chassis. The bodies which are formed by the method of the present invention are generally rather large and may measure 28 feet by 8 feet by 8 feet or more and as a consequence, it is difficult to turn the bodies right-side-up without damage to the bodies and without providing a complex and expensive inverting mechanism.

To overcome these difficulties, there is provided a body inverting mechanism which will initially engage the body at a point below its centre of gravity, relocate the body clear of its surroundings, release the body to permit controlled rotation of the body under its own weight to a position in which it is right-side-up.

SUMMARY OF INVENTION

It is an object of the present invention to provide an improved method of manufacturing bodies for vans, trailers, trucks and the like which include a glass fibre reinforced plastic outer shell.

It is a further object of the present invention to provide an improvement in the molding station of a glass fibre reinforced plastic mold wherein a single glass fibre applicator is supported for movement between a plurality of molds.

It is yet another object of the present invention to provide an improved air venting and circulation system for use in the molding of glass fibre shells for vans, trailers, trucks and the like.

It is a still further object of the present invention to provide an improved power transmission system for driving and guiding a workhead along a U-shaped guide track.

It is yet another object of the present invention to provide a transport system for use in transporting molded bodies assemblies from any one of a number of molding stations to a trimming station which is remote from the molding station.

It is a still a further object of the present invention to provide a lining inserter for use in inserting the reinforcing side wall panels, end wall panels and roof beams into the molded glass fibre shell when it is located in the mold in which it is formed.

It is another object of the present invention to provide a stripper mechanism for stripping the glass fibre body from the mold after attachment of the side and end panels thereto.

It is yet another object of the present invention to provide a trimming station remote from the molding stations in which trimming aids are provided.

It is a still further object of the present invention to provide a righting mechanism for turning the body right-side-up after it has been trimmed.

According to one aspect of the present invention there is provided a body manufacturing system for manufacturing bodies for vans, trailers, trucks and the like which comprises, a molding station having a plurality of molds each of which has a bottom face, a pair of oppositely disposed side faces and an end face, each mold having an open top and an open front end, the molds being arranged in a side-by-side relationship with their open front ends disposed toward a guide path which extends transversely thereof, a glass fibre applicator adapted to apply a layer of compacted glass fibre and resin to the bottom side and end faces of one of said molds to form a glass fibre shell, longitudinal guide means associated with each mold for guiding the glass fibre applicator along the length of each mold as it applies the required layer to form said shell, transfer means adapted to support said applicator and transport it along said guide path from one mold to another, insert locating means adapted to support side wall, end wall and roof inserts for movement between a first position in which the inserts are disposed to facilitate entry into one of said molds and a second position in which the inserts are operably located in intimate contact with the glass fibre shell and cooperate therewith to form a body, said insert locating means being movable to said first position after the inserts have been operably located to permit removal of the insert locating means from the mold, extraction means for extracting the body from the mold in which it is formed and righting means adapted to support said body and to turn it right side up for mounting on a chassis of a vehicle.

According to a further aspect of the present invention there is provided, in a molding station for use in molding glass fibre shells for bodies of vans, trailers, trucks or the like, the improvement of, a plurality of molds each having a bottom face, a pair of oppositely disposed side faces and an end face, an open top and an open front end, said molds being arranged in a side-by-side relationship with the open ends thereof opening toward a guide track which extends transversely thereof, a transfer trolley mounted for movement along said guide track to be aligned with the open end of any one of said molds, a glass fibre applicator adapted to apply a layer of compacted glass fibre and resin to the bottom side and end faces of one of said molds to form a glass fibre shell, a carriage supporting said applicator for movement onto and off of said transfer trolley and along each mold as required, a power supply at one end of said guide track, power supply cable means having a first end held fast with respect to the power supply and a second end mounted on said carriage for movement therewith, said power supply cable also being held fast with respect to the transfer trolley at a point intermediate the ends thereof, said power supply cable having a first length extending from said first end to said point sufficient to extend to the trolley when it is located at the mold which is most distant from the power supply and a second length extending from said point to said second end which is sufficient to permit said carriage to be located in an operable position adjacent the end face of any of said molds, take-up means located at said one end of said guide track and engaging said first length of said cable to take up or deploy the slack in said first length as said trolley moves toward and away from said one end of said track.

According to another aspect of the present invention there is provided, in a molding station for use in molding glass fibre shells for bodies of vans, trailers, trucks or the like, the improvement of, a plurality of molds each having a bottom face, a pair of oppositely disposed side faces and an end face, an open top and an open front end, said molds being arranged in a side-by-side relationship with the open ends thereof opening toward a guide track which extends transversely thereof, a transfer trolley mounted for movement along said guide track to be aligned with the open end of any one of said molds, a canopy for each mold, each canopy extending over and closing the open top of its associated mold, each canopy having an open front end aligned with the open end of its associated mold and an air extraction outlet at the other end thereof proximate the end wall of its associated mold, extraction means communicating with each extraction outlet for extracting air therethrough, and, fresh air supply means having outlets disposed opposite the open front end of each mold for directing a stream of fresh air into the front end of each mold to provide a supply of fresh air to replace the contaminated air which is withdrawn by the extraction means in use.

According to yet another aspect of the present invention there is provided, in a guidance system for guiding a work head along a predetermined path having; a U-shaped guide track extending in a first plane, a turntable mounted for rotation about a first axis which extends perpendicular to said first plane and is located equidistant from each side of the U-shaped guide track, a track follower mounted in said track, a first slide member slidably mounted on said turntable for movement with respect to said turntable in a first radial direction with respect to said first axis, a second slide member slidably mounted on said turntable for radial movement with respect to said first axis in a direction opposite said first direction, a work head mounted on said second slide member for movement therewith, and power transmission means for driving said track follower and said slide members whereby the second slide member is the slave of the track follower, the improvement wherein the power transmission means comprises; a drive chain having portions of its length coextensive with, and mounted for movement along, said U-shaped guide track, a sprocket mounted for rotation at each corner of the U-shaped guide track, said sprockets engaging and guiding said chain around said corners, said track follower comprising a follower roller mounted on said drive chain for movement along said guide track with said chain, drive means drivingly connected to said drive chain for driving said chain to and fro along said track, said first slide member being secured to said follower for movement therewith along said U-shaped guide track to effect radial movement of said first slide member with respect to said turntable, a first rack member mounted on said slide member for movement therewith, a pinion member mounted for rotation on said turntable, said pinion member having a first pinion gear portion meshed with said first rack and a larger second gear portion, said first and second gear portions having a gear ratio which is proportional to the ratio of the proportions of the guide track to the proportions of said predetermined path, a second rack member mounted on said second slide member and meshed with said second gear to drive said second slide member in response to rotation of said turntable as aforesaid.

According to another aspect of the present invention there is provided, in a guidance system for guiding a work head along a predetermined path having; a frame, a U-shaped guide track on said frame and extending in a first plane, a turntable mounted for rotation about a first axis which extends perpendicular to said first plane and is located equidistant from each side of the U-shaped guide track, a track follower mounted in said track, a first slide member slidably mounted on said turntable for movement with respect to said turntable in a first radial direction with respect to said first axis, a second slide member slidably mounted on said turntable for radial movement with respect to said first axis in a direction opposite said first direction, a work head mounted on said second slide member for movement therewith, and power transmission means for driving said track follower and said slide members whereby the second slide member is the slave of the track follower, the improvement wherein the power transmission means comprises; a drive chain having portions of its length coextensive with, and mounted for movement along, said U-shaped guide track, a sprocket mounted for rotation at each corner of the U-shaped guide track, said sprockets engaging and guiding said chain around said corners, said track follower comprising a follower roller mounted on said drive chain for movement along said guide track with said chain, a variable speed reversible drive motor mounted on said frame and having a drive sprocket drivingly engaging said drive chain and control means for controlling the direction of rotation and speed of operation of said drive motor to control the direction of rotation and speed of operation of said work head.

According to yet another aspect of the present invention there is provided, in a body manufacturing system for manufacturing bodies for vans, trailers, trucks and the like comprising: a molding station having a plurality of molds each of which has a bottom face, a pair of oppositely disposed side faces and an end face which are larger in area than the required area of the corresponding side, top and end walls of the body to be formed therein, each mold having an open top and an open front end, the molds being arranged in a side-by-side relationship with their open front ends disposed toward a guide path which extends transversely thereof, a trimming station remote from said molding station, an overhead rail system for use in transporting a molded body from any one of said molds to said trimming station comprising, a first guide rail located above and extending longitudinally of each mold, each first guide rail having an outer end located outwardly from the open front end of its associated mold, a second guide rail comprising a plurality of serially arranged segments, the first of which extends from the trimming station to a first transfer point adjacent the outer end of a first of said guide rails and successive segments extending from said first transfer point to successive transfer points adjacent the outer ends of adjacent first guide rails with the last segment being connected directly to the last first guide rail, and, switching means at each transfer point which is operable to connect successive segments of said first guide rail to one another or to the outer end of an adjacent first guide rail whereby any one of said first guide rails may be connected to the first segments of the second guide rail.

According to yet another aspect of the present invention there is provided, in a body manufacturing system for manufacturing bodies for vans, trailers, trucks or the like having a mold which has a bottom face, a pair of oppositely disposed side faces and an end face upon which a glass fibre shell is formed in use, the improvement; a lining inserter frame comprising; a bottom wall, a pair of oppositely disposed side walls pivotally mounted on and extending upwardly from opposite sides of said bottom wall, a front wall pivotally mounted on and extending upwardly from the front end of said bottom wall, said end and side walls being adapted to support end and side panels outwardly therefrom in a face-to-face relationship and beam support means on said bottom wall for supporting a plurality of roof beams, first jacking means connected to said frame and said side walls and second jacking means connected to said frame and said end wall, said first and second jacking means being operable to cause said side and end walls to pivot between and inwardly inclined position in which side and end wall panels located thereon are toed inwardly to facilitate entry of the inserter into a mold and an upright position in which the side and end panels of the liner may be located in a face-to-face relationship with the side and end faces of a molded shell located in a mold, and roof beam biasing means on said bottom wall for engaging said roof beams intermediate their ends to initially bias the roof beams inwardly, said roof beam biasing means being releaseable from a roof beam to permit the roof beam to move into intimate contact with the underlying shell portion.

According to another aspect of the present invention there is provided, in a body manufacturing system in which a body for a van, truck or the like is formed in a mold, the body comprising a molded glass fibre shell and a liner which comprises a pair of oppositely disposed side panels and an end panel, the side panels having exposed upper edge portions, the improvement of stripper means for stripping the body from the mold comprising; first and second clamp means disposed opposite one another and adapted to be releaseably secured to the exposed upper edge portions of the side panels of a liner of a body mounted in the mold, bridge means extending between said oppositely disposed clamp means, said bridge means being adapted to telescope to permit movement of said oppositely disposed clamping means toward one another, suspension means for suspending said bridge means comprising; a centrally located suspension cable and a pair of diverging side cables extending from the central cable one to each oppositely disposed clamp means, and hoist means for raising the central cable and transmit an inwardly and upwardly directed force to each clamp means tending to draw the side walls upwardly and inwardly toward one another, to telescope the bridge member and separate the side walls of the body from the mold to facilitate removal of the body from the mold.

According to yet another aspect of the present invention there is provided, in a body manufacturing system for manufacturing a body for a van, truck or the like in which an oversized glass fibre reinforced plastic shell is formed in a mold and is lined with a rigidifying liner, the improvement of a trimming station remote from the mold in which the liner is formed comprising; a side rail assembly extending longitudinally of the trimming station, support means for supporting said side rail assembly so that it may be raised or lowered with respect to the side wall of a body located in an upside-down position in said trimming station, clamping means on said support means for releaseably securing said support means to the side wall of a body located in said trimming station, slide means slidably mounted on said support means for longitudinal movement along said support means and cutter means mounted on said slide member for movement therewith to cut the side walls of said shell as the slide member moves along the support means to remove excess material from the shell.

According to a further aspect of the present invention there is provided, in a body manufacturing system for use in manufacturing bodies for vans, trailers, trucks and the like wherein the body is oriented so as to be upside down when its manufacture has been substantially completed, the improvement of; a body righting mechanism for turning the body right-side-up comprising; hoist means which is operable to be raised or lowered as required, a pair of support columns suspended from said hoist means in a spaced relationship for movement with said hoist means, rotor means mounted for rotation on each support means about a common axis, each rotor means being adapted to be secured to opposite ends of a body below the centre of gravity of the body, damper means communicating with each rotor means for controlling the rate at which each rotor means may rotate, brake means at at least one of said rotor means for releaseably securing said one rotor means against rotation,

BRIEF DESCRIPTION OF DRAWINGS

FIG. 2 is a front view of a portion of the applicator assembly showing the power transmission chain and sprocket assembly, FIG. 3a is a sectional view taken along the line 3—3 of FIG. 2.

FIG. 4 is a sectional view taken along the line 4—4 of FIG. 2.

FIG. 8 is a pictorial view of the wall panel inserter constructed in accordance with an embodiment of the present invention.

FIG. 9 is an end view of the inserter of FIG. 8 showing the movement of the side wall panels between their toed-in position and their upright position and the movement of the roof beams between their concave arch position and their released position. FIG. 10 is a sectional view taken along the line 10—10 illustrating a pressure pad in its extended position.

FIG. 11 is an enlarged detailed view of the movable pressure pad illustrated in FIG. 9.

FIG. 12 is a pictorial detailed view of the end mounting mechanism for the roof beams and the locater for locating the side wall panels.

FIG. 13 is a plan view of a portion of the inserter showing the end panel locater and the mechanism for applying pressure to the end panel.

FIG. 14 is a sectional view taken along the line 14—14 of FIG. 8.

FIG. 15 is a sectional view through a side and top wall of the mold showing the positioning of the side panels and roof beams with respect to the side and bottom of the molded shell.

FIG. 16 is a pictorial view illustrating the removal of the assembled body and shell from a mold.

FIG. 17 is a pictorial view illustrating the clamping mechanism used for clamping the body to remove it from the mold.

FIG. 18 is a side view of the gripper mechanism used for gripping the roof beams and locating them in concave arched configuration during the inserting of the roof beams into the molded shell.

FIG. 19 is a pictorial view of an end of a body shell showing the mounting of an end cap at the open end of the molded shell.

FIG. 20 is a sectional view through an assembled end cap taken in the direction of the line 20—20 of FIG. 19.

FIG. 21 is a diagrammatic plan view illustrating the layout of the transport rail system used for transporting bodies from the various molds of the molding station to the trimming station.

FIG. 22 is a sectional view taken along the line 22—22 of a switch used for selectively connecting the transport rails to one another.

FIG. 24 is a pictorial view of a body righting mechanism constructed in accordance with an embodiment of the present invention.

FIG. 25 is a sectional view taken through the body of FIG. 24 along the line 25—25 illustrating the mounting of the floor boards.

DESCRIPTION OF PREFERRED EMBODIMENT

Figures 1, 1A:
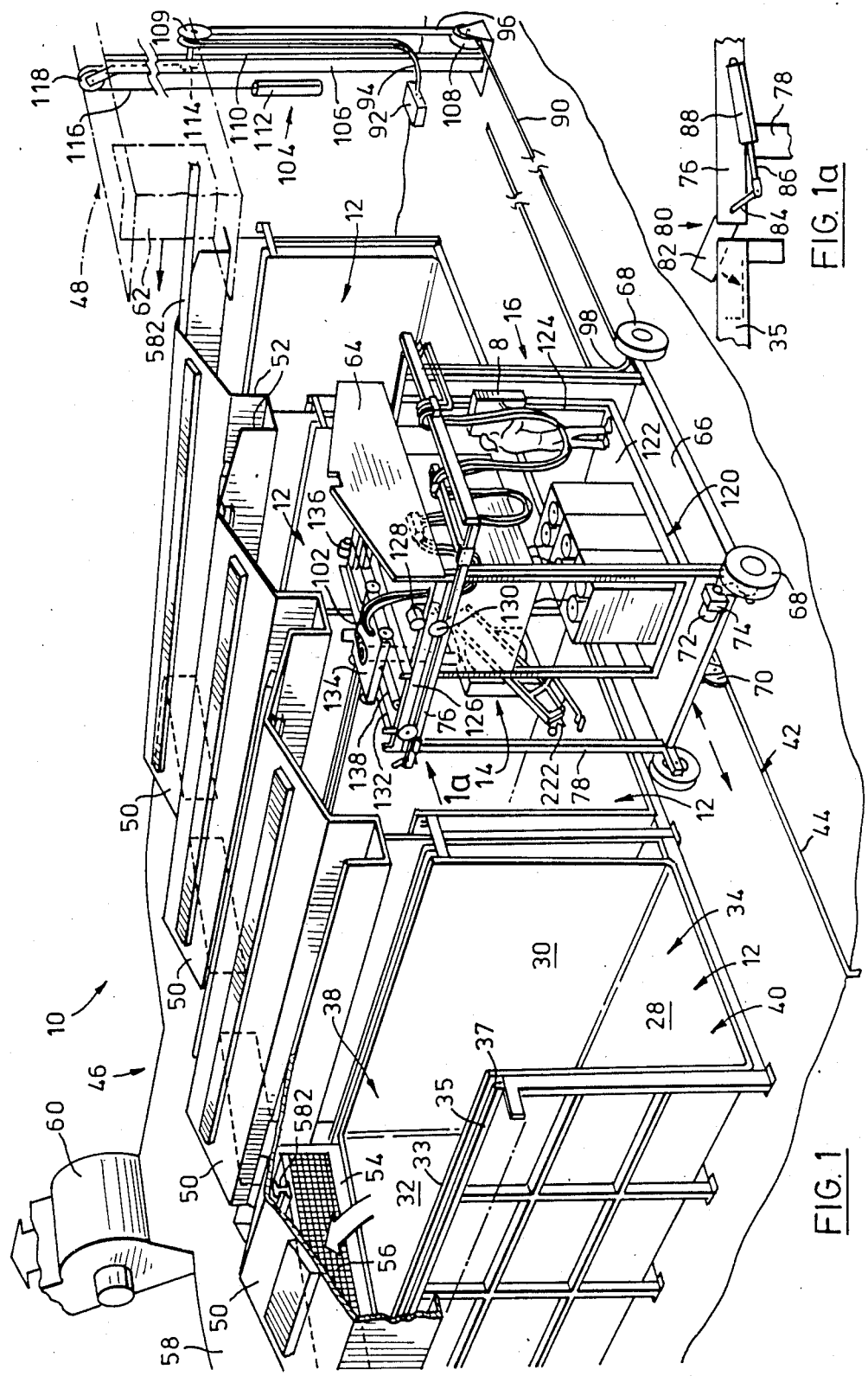
FIG. 1 is pictorial view of a molding station and glass fibre applicator constructed in accordance with an embodiment of the present invention.
FIG. 1a is a partially sectioned side view of the latching mechanism which serves to align the transfer trolley with respect to each mold.

With reference to FIG. 1 of the drawings, the reference numeral 10 refers generally to a molding station constructed in accordance with an embodiment of the present invention. A plurality of molds 12 is located in the molding station. For the purposes of forming a glass fibre reinforced plastic shell in the molds, an applicator 14 is provided which is mounted on a transfer trolly 16 for movement from one mold 12 to another.

For the purposes of inserting reinforcing side and end wall panels within the glass fibre reinforced plastic shells which are formed in the mold, a liner inserter 18 (FIG. 8) is provided. After the reinforcing liner elements have been mounted in the molded shell to form a body, it is necessary to remove the body from the mold and for this purpose, a mold extractor 20 (FIG. 16) is provided. To facilitate the finishing and trimming of the body, a trimming station 22 (FIG. 23) is provided. As illustrated in FIG. 21 of the drawings, an overhead rail system 24 is provided for use in transporting a molded body from any one of the molds 12 to the trimming station 22. As illustrated in FIG. 24 of the drawings, a body righting mechanism is provided for use in turning the body right-side-up.

Molding Station

The molding station 10 will now be described with particular reference to FIG. 1 of the drawings. As shown in FIG. 1, each of the molds 12 has a bottom face 28, a pair of oppositely disposed side faces 30 and an end face 32, the mold cavity 34 which is formed by the bottom face 28, side faces 30 and end face 32, is proportioned so as to be greater in size than the proportions of the body which forms the end product. Guide rails 35 are located in a spaced parallel relationship with respect to the upper edges 33 of the side walls of the mold 12. The guide rails 35 each have a notch 37 formed at the front end thereof. The bottom wall, side walls and end wall of each mold may be made from any suitable rigid material such glass fibre reinforced plastic, sheet metal or the like and a stiffening support frame 36 is provided outwardly of each wall of the mold to provide the required rigidity. The bottom, side and end faces are formed with a surface finish and a contour which corresponds to that required on the outer surface of the molded shell.

Each mold 12 has an open top 38 and an open front end 40. The molds 12 are arranged in a side-by-side relationship with their open front ends 40 disposed toward a guide path 42 which is in the form of a guide trough 44.

For the purposes of extracting contaminated air and supplying fresh air to each mold, an air extraction system 46 and an air supply system 48 is provided.

The air extraction system 46 includes a canopy 50 located above the open upper end of each mold. Each canopy 50 has an open front end 52 which is aligned with the open front end 40 of its associated mold. An end wall 54 is located at the back end of each canopy 50 and has a screened air extraction passage 56 opening therefrom into a duct 58 which is connected to an air extraction blower 60. When the air extraction blower is in operation, a substantial volume of air is extracted from each mold through the extraction passages 56. To provide a supply of fresh air for each mold cavity, the air supply duct 48 is arranged to extend across the open front ends 52 of the canopy 50 in a spaced relationship thereto and is provided with a plurality of discharge passages 62 which are arranged to direct a supply of fresh air toward the mold cavities 34.

To increase the face velocity of the air moving through the mold cavity and ensure that fresh air is constantly directed to the operators work station, an end wall 64 is mounted on the applicator 14 and is shaped to fit in a close fitting sliding relationship within the contour of the cross-section of the canopy. The end wall 64 directs the movement of fresh air through the operator work station to the extraction passage 56.

Transfer Trolly

The transfer trolly 16 has a base 66 which is mounted on wheels 68. A tracking wheel 70 is mounted on the base 66 and extends into the guide trough 44. A small hydraulic drive motor 72 is drivingly connected to one of the wheels 68 through a reduction gear 74. By activating the hydraulic motor 72, the transfer trolly 16 can be moved to any point along the length of the guide path 42 so as to be located opposite any one of the molds 12. The transfer trolly 16 has horizontal guide rails 76 located at the upper end of support columns 78. For the purposes of aligning the guide rails 76 of the transfer trolly with the guide rails 35 of each mold, a latch mechanism generally identified by the reference numeral 80 (FIG. 1a) is provided. The latch mechanism includes a latch plate 82 which is pivotally mounted at the end of the guide rail 76 and is connected by means of a lever arm 84 to the shaft 86 which is carried by a piston which is mounted for movement in a cylinder 88. Electrical, air power and materials supply lines include a first length 90 which has a first end 94 connected to a power source 92 and a second end connected and held fast to a junction box 98 which is located on the transfer trolley 16. This first length 90 forms a first umbilical cord assembly 96 which extends from the source 92 to a junction box 98 on the transfer trolley 16 which serves to permit movement of the trolley with respect to the power source. The various supply lines extend from the junction box to the various powered drives and the like.

A second umbilical cord assembly 100 extends from the transfer trolley 16 to the bogey 126. The second umbilical cord 100 has an end 101 which is mounted on the bogey 126. A third umbilical cord 103 of the power supply lines, which include hydraulic supply lines has one end connected to the bogey and its other end connected to the carriage 134. It will be apparent that the make up of the umbilical cords will vary according to the downstream requirements of the mechanisms which are to be operated or controlled thereby.

A take-up mechanism 104 is provided for the purposes of taking up slack in the first umbilical cord assembly 96. The take-up mechanism 104 includes an upright post 106 which has a pulley 108 located at the lower end thereof and a take-up pulley 109 which is mounted on a slide 114 which is slidably mounted in the channel 110. The counterweight 112 is connected by means of a cable 116 to the slide 114. The cable 116 extends around a pulley 118 which is located at the upper end of the upright post 106. In use, when the trolly 16 moves away from the upright post 106, the power supply cable 90 is deployed from the take-up mechanism 104 by causing the take-up pulley 109 to be lowered and this has the effect of raising the counterweight 112. When the trolly 16 moves toward the take-up mechanism the slack which is formed in the first length 96 of the power supply cable is taken up by the effect of the counterweight which raises the pulley 109 to take-up the slack.

The Applicator

The applicator 14 is mounted on a carriage assembly 120 which has a work platform 122 and upright columns 124 which depend from a wheeled bogey 126 which is mounted on the guide rails 76 of the transfer trolly 16. A drive motor 128 is mounted on the bogey 126 and drivingly engages one of the wheels 130 of the bogey, through a reduction gear, and is operable to drive the bogey longitudinally of the guide rails 76 of the trolley 16 and along the guide rails 35 of each mold.

of transverse guide rails 132 extend transversely of the bogey 126. A transverse transportation carriage 134 is mounted for movement along the transverse guide rails 132. A reversible drive motor 136 is connected to the carriage 134 by means of a drive chain 138 and is operable to drive the transverse transportion carriage to an fro along the guide rails 132 as required in use.

The end 102 of the third umbilical cord 100 of the power supply lines, which include hydraulic supply lines, is mounted on the carriage 134.

Figures 6, 7:
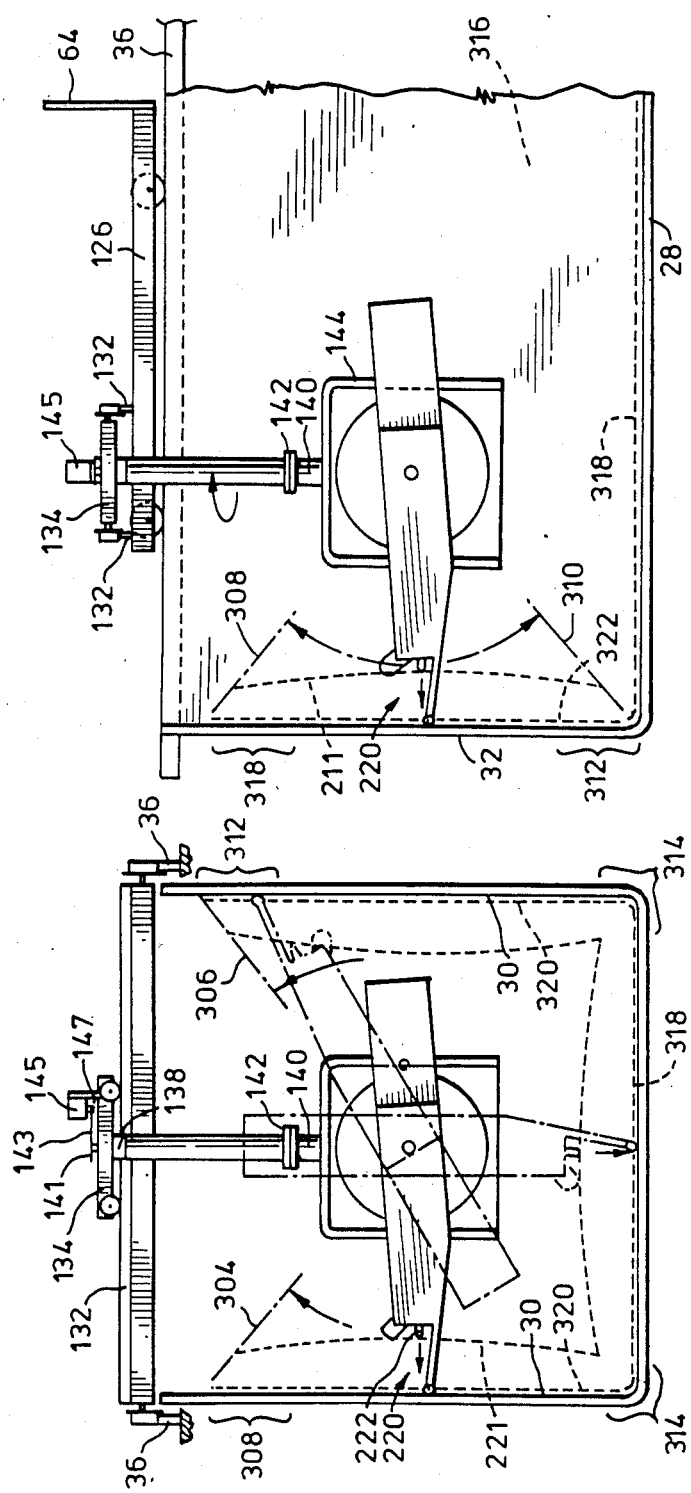
FIG. 6 is an end view of a mold showing various positions of the workhead as it traverses the mold.
FIG. 7 is a side view of a mold showing the movement of the workhead with respect to the end wall of the mold.

As more clearly illustrated in FIG. 6 and 7, a vertical support shaft 138 is mounted for rotation in the carriage 134 and extends downwardly therefrom. A sprocket 141 is mounted at the upper end of the shaft 138 and is connected by means of a chain 143 to a sprocket 147 which is mounted on the output shaft of a reduction gear box which is powered by a drive motor 145.

As shown in FIG. 2 of the drawings, the shaft 138 is connected to the shaft 140 by a flanged connection 142. A frame 144 is mounted on the shaft 140. A U-shaped guide track 146 is formed in a side face 148 of the frame 144 and has oppositely disposed side faces 150 and 152. Sprockets 154 are mounted on the frame 144 at each corner of the U-shaped track and at each free end of the U-shaped track. Sprockets 156 and 158 are also mounted on the frame 144. The sprocket 158 is a take-up sprocket which is adjustable with respect to the frame 144. A drive sprocket 160 is mounted on a drive motor 162. An endless chain 164 extends around sprockets 154, 156, 158 and 160. The drive motor 162 is a reversible drive motor so that it can be operated to drive the chain 164 in either direction.

The chain 164 has portions of its length which are coextensive with the U-shaped guide track and located centrally of the U-shaped guide track.

As shown in FIG. 3 of the drawings, a track follower 166 which is in the form of a roller is mounted in the guide track 146 in a close fitting free rotating relationship so that it may rotate in either direction when it bears against the side faces 150 or 152 of the channel. The follower 166 is proportioned so as to be out of engagement with one of the side faces 150, 152 when in engagement with the other. The track follower 166 is mounted on a first slide member 168 by means of a mounting bolt assembly 170.

Referring once more to FIG. 2 of the drawings, it will be seen that a turntable generally identified by the reference 172 has a backing plate 174 on which is mounted a face plate 178. The backing plate 174 and the face plate 178 are mounted for rotation on a shaft 176 which is supported by the frame 144. The turntable 172 is rotatable about the axis of the shaft 176 which extends at right angles to the plane in which the guide track 146 extends.

A pair of guide rods 180 are mounted on the backing plate 174 of the turntable 172 in a spaced parallel relationship, one on either side of a longitudinally elongated passage 182. The slide member 168 is slidably mounted on the rods 180 for movement radially of the axis of rotation of the turntable.

A second slide member 184 is mounted for longitudinal movement with respect to the backing plate 174 of the turntable 172. Two guide rails 186 are mounted on the backing plate 174 and extend longitudinally thereof in a spaced parallel relationship. The second slide member 184 has a frame 187 which includes slide blocks 188 which have recessed slipways 190 which slidably receive the guide rails 186. The guide rails 186 have an enlarged rounded outer edge which fits within the slipways 190 with the result that while the frame 187 is free to move along the guide rails 186, it is retained on the guide rails by the interlocking relationship of the enlarged outer edges 192 and the recessed slipway 190. A cover plate 194 is mounted on the frame 187.

Power is transmitted from the first slide 168 to the second slide 184 by means of a power transmission system generally identified by the reference numeral 195 which is illustrated in FIGS. 2 and 4 of the drawings. The power transmission system includes a first rack member 196 which is mounted on and protects longitudinally from the first slide member 168. A second rack member 198 is mounted on and extends longitudinally of the second slide member 184.

A spacer block 200 is mounted on the backing plate 174 and supports a plate 202 in a spaced parallel relationship with respect to the backing plate 174. A shaft 204 is mounted for rotation in bearings 206 and 208 which are carried by the backing plate 174 and the face plate 202 respectively. Pinions 210 and 212 are keyed to the shaft 204 by means of a key 214 for rotation therewith. The pinion 210 is meshed with the first rack 196 and the pinion 212 is meshed with the second rack 198. The gear ratio of the pinion 212 with respect to the pinion 210 is proportional to the ratio of the proportions of the U-shaped configuration of the mold 12 with respect to the U-shaped configuration of the guide track 146. Preferably, the ratio is of the order of 3 to 1.

To provide an underlying support for the second rack member 148, rollers 216 are mounted on a support block 218 which is secured to the backing plate 174.

In use, it will be seen that as the first slide member is caused to reciprocate to and fro with respect to the turntable 72, the second slide member 184 will be caused to reciprocate in the opposite direction. It has been found that this form of rack and pinion power transmission means provides a simple and inexpensive mechanism for translating the movement of the follower 166 along the guide track 146 into reciprocating movement of the second slide member 184 which supports the workhead 220.

The workhead 220 consists of a spray head 222 and a chopper 224 which are mounted at the outer end of the second slide member 184. A suitable dispenser for use in this application is manufactured by Venus Products Inc. and is identified as an H.I.S. chopper gun.

A compactor roller 226 is mounted on the frame support 228 which is pivotally mounted on an arm 230 which is secured to a further arm 232. The arm 232 is connected to the second slide member 184 by means of a parallelogram linkage generally identified by the reference numeral 234. An extensible ram 236 has one end connected to the second slide member 184 and its other end connected to the parallelogram linkage 234 such that the ram 236 can be extended to cause the roller 226 to be moved outwardly in the direction of the arrow 238 or contracted to move the roller in a direction opposite to the direction indicated by the arrow 238.

Workhead Arcuate Movement Controls

The controls which control the length of arc of movement of the workhead 220 and the speed of movement of the workhead 220 will now be described with reference to FIGS. 5, 6 and 7 of the drawings. The controls which are generally identified by the reference numeral 240 include a cam plate 242 and a switching block assembly 244.

The cam plate 242 is keyed by means of a key 246 to the shaft 176 upon which, as previously described, the turntable 172 is mounted for rotation with respect to the frame 144. The cam plate 242 has two cam tracks 248 and 250 extending about its perimeter. The cam tracks 248 and 250 are arranged side-by-side. The cam track 248 has nodes 252 and 254 and a valley 256. The cam track 250 has a node 258. The nodes 252 and 254 of the cam track 248 also extend across the cam track 250. Arcuate slots 260 extend through the cam plate 242 in an arc generated from the access of the shaft 176. Stop pins 262 each have a shaft portion 264 which extends through a slot 260 and is threaded in the back plate portions 266 of the node members 250, 252 and 254. The head portions 268, 270 and 272 of the pins 262 cooperate with the node members into which they are threaded to clamp one another in a predetermined position with respect to the cam plate 242. It will be noted that the head portion 272 has a portion 274 of reduced diameter which serves to provide a passage 276. The head portions 268, 270 and 272 have an axial length which is substantially equal to the axial length of the cam tracks 248 and 250.

The switch block assembly 244 consists of a speed control valve 278, reversing switches 280 and 282, and a shifter cylinder 284. The speed control valve 278 is in the form of an adjustable hydraulic valve in which the rate of flow of hyraulic fluid through the valve is controlled by the position of the plunger 286. By depressing the plunger 286, the flow through the valve 278 is reduced. The valve 278 is connected through an inlet conduit 288 to a source of pressurized hydraulic fluid. The outlet conduit 290 is connected to the motor 162 through a reversing valve (not shown) which is activated by a switches 280 and 282 to control the speed of movement of the workhead 220. The reversing switches 280 and 282 are operable to reverse the direction of rotation of the motor 162. The reversing switches 280 and 282 each have actuator lever arms 290 and 292 which have rollers 294 and 296 at their outer ends. A roller 298 is mounted at the outer end of the plunger 286. The shifter cylinder 284 is a double acting cylinder which is operable to move the ram 288 between a position in which the roller 298 of the speed control valve 278 is aligned with either the cam track 248 or the cam track 250. When the shifter is in a position locating the roller 298 for movement along the cam track 248, the rollers 294 and 296 of the reversing switches 280 and 282 are aligned with the passage 276 formed in the head portion 272. The cam track 248 controls the operation of the workhead when in use to apply a coating to the side and bottom walls of the mold and a cam track 250 is adapted to control the movement of the workhead when it is applying a coating to the end wall of the mold. When the shifter 284 is activated to move the roller 298 of the speed control valve 274 into alignment with the cam track 250, the rollers 294 and 296 of the switches are aligned with the inner portion 272a of the head 274 so that they will be activated by contact therewith.

Figure 5:
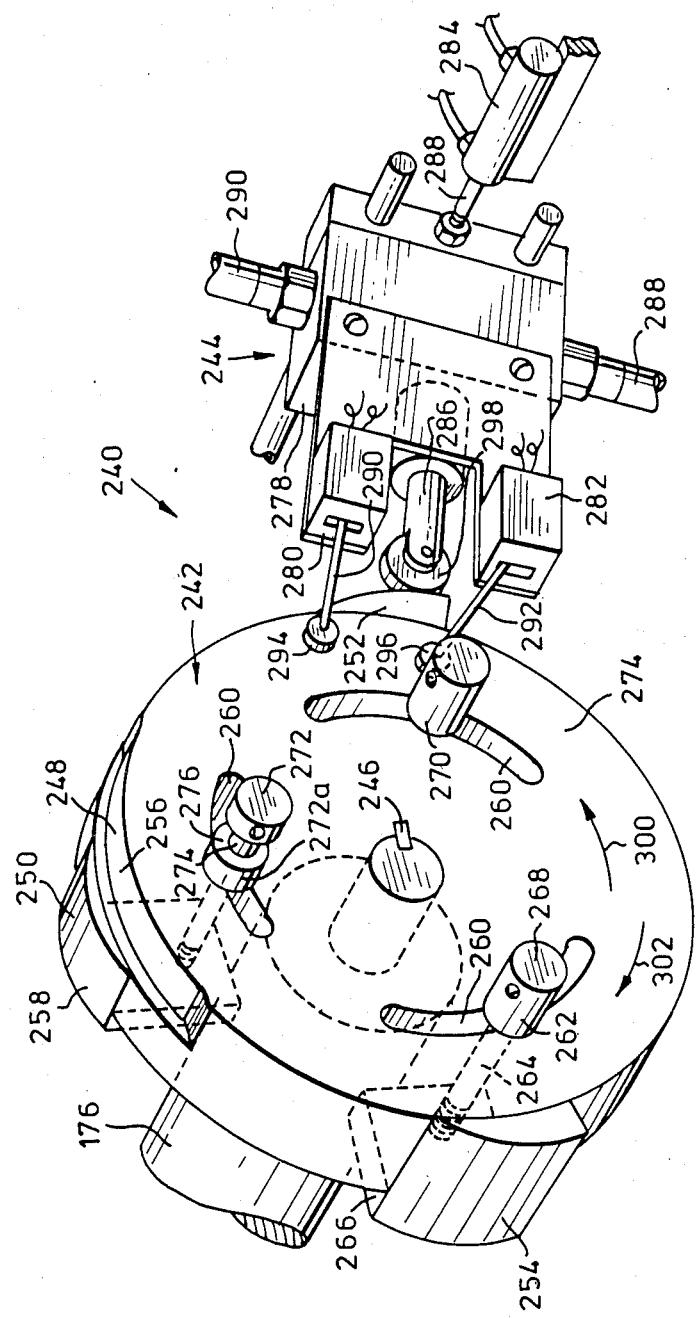
FIG. 5 is a pictorial view illustrating the motor speed control system for controlling the speed and extent of movement of the workhead.

In use, when the side walls of the mold are to be coated, the shifter cylinder 284 locates the switch block assembly 244 in the position shown in FIG. 5. When the cam plate 242 is rotatably driven in the direction of the arrow 300, the speed of operation of the drive motor 162 will be progressively reduced as the roller 298 of the speed control valve 278 is moved radially outwardly by travelling along the inclined surface of the node 252 and will be brought to a halt when the lever arm 292 of the reversing switch 282 is located in the reversing position by engagement with the head portion 270. The direction of rotation of the motor 162 will then be automatically reversed to cause the cam plate 242 to rotate in the direction of the arrow 302. The speed of operation of the motor 162 will progressively increase as the roller 298 moves down the inclined surface of the node 252 and will continue at a substantially uniform speed of rotation until the roller 298 reaches the valley 256 at which time the speed of operation of the motor will be increased until the roller 298 emerges from the valley whereupon the motor 162 will operate at the same speed at which it operated prior to encountering the valley 256. The motor 162 will continue at this speed until the roller 298 comes into contact with the node 254 at which time the speed of operation will be progressively decreased until the head portion 268 displaces the actuator lever arm 290 to a position which causes the direction of rotation of the motor 162 to be once again reversed. As previously indicated, the roller 294 of the arm 290 will pass through the passage 276 which is formed in the head 272. With reference to FIG. 6 of the drawings, the lines 304 and 306 indicate the positions of the axis of the discharge nozzle 220 at the point of reversal of direction of rotation of the motor 162.

When the workhead 220 is to be operated to apply a coating to the end wall 32 of the mold as shown in FIG. 7, the shifter 284 is activated to align the roller 292 of the plunger 284 with the cam track 250 and as previously described, the rollers 294 and 296 will then be aligned with the head portion 272a of the head 272. The lines 308 and 310 which are shown in FIG. 7 of the drawings, indicate the outer limits of the arc of movement of the workhead 220 between which the head 220 is caused to oscillate by consecutively operating the reversing switches 280 and 282. The head portions 270 and 272a serve to effect reversal of the direction of movement of the motor 162 to control the reversal of direction of the movement of the workhead. Similarly, the nodes 252 and 250 control the position of the speed control plunger 286 during arcuate movement of the workhead when the workhead is in the second of its operating positions for applying a coating to the end wall.

When the side walls of the mold have been coated and the end wall is to be coated the applicator is relocated to assume the position shown in FIG. 7 in which the workhead 220 is disposed so as to coat a first portion of the end wall which extends from an adjacent side wall. It will be understood that by reason of the fact that the coating is applied by a spraying process the coating which is applied to the end wall will be formed integrally with the coating which is applied to the side wall. The workhead 220 is relocated in the position shown in FIG. 7 by causing the bogey 126 to back up from the end wall 32 and by moving the transverse transportation carriage 134 to one end of the transverse guide rails 132 on which it is mounted. Simultaneously the motor 145 is activated to rotate the shaft 140 through 90°. The applicator is then activated as previously discribed to apply a coating to the end wall and moves through arc between the lines 308 and 310 as the workhead is driven laterally with respect to the end wall 32 by movement of the transverse carriage 134 along the guide rails 132 until the end wall of the mold is completely coated.

By reducing the speed of rotation of the motor 161 by means of the nodes 250, 252 and 254, the thickness of the layer of glass fibre reinforced plastic which is applied to the mold is increased in the areas where the speed of movement of the workhead is reduced. Similarly, by increasing the speed of the motor 162 when the follower 198 is travelling along the valley 254, the thickness of the coating which is applied to the bottom wall of the mold is reduced. It has been found that there is an advantage to be obtained by increasing the thickness of the coating in the areas 312. It is possible reduce the thickness of the top wall of the molded shell because the roof of the does not require the same structural strength as the side walls.

It will be apparent from the foregoing that by adjusting the positions of the various nodes and heads of the cam assembly, it is possible to control the operation of the spray head to manufacture shells of different size and thickness. It will be understood that in use, the workhead is manipulated to spray a mixture of chopped glass fibre filaments and resin onto the wall of the mold to form a shell 316. The shell 316 is formed with a bottom wall 318 which will ultimately form the roof of the van body, a pair of oppositely disposed side walls 320 and an end wall 322 which correspond to the coated areas of the mold.

Liner Inserter

Before the shell 316 is removed from the mold 12 in which it is formed, reinforcing liners and roof beams are positioned in and secured to the shell. For the purposes of locating the liners in the shell, a liner inserter 18 is provided and will now be described with reference to FIGS. 8 to 15 and 18 of the drawings. With reference to FIG. 8 of the drawings, it will be seen that the liner inserter 18 has a wheeled bogey 324 upon which oppositely disposed side frames 326 are pivotally mounted by means of hinges 328. Each frame 326 consists of a pair of longitudinally extending beam members 330, a plurality of spaced parallel beam members 332 extending between the members 330 and a further beam member 334 which is mounted on the inner face of the side frames 326 and extends longitudinally thereof.

As shown in FIGS. 8 and 9, the bogey 324 has a plurality of cylinder support frames generally identified by the reference numeral 336 located at spaced intervals along the length thereof. The cylinder support frames 336 each consist of a pair of upright posts 338, a bridge member 340 and rigidifying struts 342. A plurality of double acting jacking cylinders 346 each have one end mounted on a bracket 344 supported by the bridge member 340. The movable piston rods 348 of the cylinders 346 have their outer ends secured to brackets 350 mounted on beams 334.

By activating the cylinders 346, it is possible to move the side frames 326 between the toed-in configuration shown in FIG. 9 of the drawings and an upright position.

Pressure pads 352 and 354 are mounted on the side frames 326. As shown in FIG. 10 of the drawings, the pressure pad 352 consists of a flat circular disk 356 which is mounted on a shaft 358 which has a head portion 360 at the other end thereof. Passages 362 and 364 open through the beam 332. The passage 362 is larger in diameter than the passage 364. A compression spring 366 has one end bearing against the disk 356 and its other end bearing against the inner face of the wall of the beam 332 through which the passag 346 extends. By applying pressure to the pad 356 through the spring 366, the spring 366 is free to yield to permit relative movement of the pad 352 with respect to the beam 332.

The pressure pad 354 is of a similar construction to that previously described with reference to FIG. 10 with the exception that the shaft 358 is longer than that of the pads 352. The lever plate 372 is mounted on a shaft 374 which is pivotally mounted on brackets 370. A passage 376 is formed in the lever 372 and the shaft 358 extends through the passage 376. The head portion 360 is proportioned so as to be larger than the passage 376. An actuator lever arm 368 is mounted on the shaft 374 and can be releaseable secured in the position shown in FIGS. 8 and 11 by means of a hook 378 which is secured to the transverse beam 380.

To retract the pressure pads 359 the lever arm 368 is pivoted to the position shown in FIGS. 8 and 9 and secured in this position by the hook 378. To release the pressure pads 354 it is merely necessary to disconnect the hook 378 from the lever arm 368 whereupon the compression spring 366 will reassert itself to extend the pressure pads 354 to their full extent or to the extent permitted by a reinforcing side wall located thereon in use.

The wheels 382 of the bogey 324 are retractable. The wheels 382 are mounted on support plates 384 which are mounted on a shaft 386. A sprocket 390 is mountd on the shaft 386 and is connected to a sprocket 388 which is mounted on shaft 398 which has a crank handle 392 at one end thereof. The sprocket 390 is connected to the sprocket 388 by means of a chain 394 such that by rotating the crank handle 392, it is possible to cause the wheel support plate 384 to pivot in the direction of the arrow 396 so that it is retracted inwardly of the frame of the bogey 324.

Roof Beam Locater

For the purposes of strengthening the roof structure of the shell, a plurality of roof beam members 400 (FIG. 8 and FIG. 12) is initially mounted on the inserter 18. Each roof beam 400 consists of an elongated U-shaped channel portion 402 which has side flanges 404 projecting laterally therefrom. In the relaxed configuration the roof beams 400 normally assume a shallow convex curvature. This curvature is reversed prior to installation.

For the purposes of accurately positioning the roof beams 400, a plurality of L-shaped stop plates 406 are mounted on an elongated rod 408 which is pivotally mounted in a plurality of spaced boss members 410 which are mounted on the longitudinal side beams 412 of the bogey 324. By rotating the handle 414, the stop plates 406 can be pivoted to and fro in the direction of the arrows 416. Short alignment lugs 418 are mounted on the underside of the side beams 412 and project downwardly therefrom so as to be arranged one on opposite sides of the U-shaped channel section 402 of the roof beams 400 when correctly aligned.

With reference to FIGS. 8, 9 and 18 of the drawings, the reference numeral 420 refers generally to the roof beam biasing mechanism which serves to initially support the roof beams 400 on the inserter 18 in the position shown in FIG. 9 of the drawings in which they have a shallow concave curvature. The roof beam biasing mechanism is supported from platforms 422 (only one of which is shown) which are located at opposite ends of the bogey and supported by longitudinal beam members 424. A guide rod 426 is mounted on the beam members 424 and is located substantially centrally of the length of the roof beam biasing mechanism 420 to assist in maintaining alignment of the mechanism.

The roof beam biasing mechanism 420 consists of a pair of spaced parallel beams 428 which are mounted on a piston rod 430 of a jacking cylinder 432 which is operable to raise and lower the beams 428. A plurality of clamping arm sets 434 is provided. Each clamping arm set 434 consists of a pair of arms 436 and 438 which are pivotally mounted on the longitudinal beams 428. The arms 436 have their upper ends pivotally mounted on a longitudinal beam member 440 and the arms 438 have their upper ends pivotally mounted on a longitudinal beam member 442. A bracket 444 ismounted on the longitudinal beams 428. A first clamping cylinder 446 has one end mounted on the bracket 440 and its other end mounted on an arm 438. A second clamping cylinder 448 has one end mounted on the bracket 444 and its other end mounted on an arm 436. A tie member 450 extends obliquely between arms 438 and 434. Tension springs 452 extend between the arms 438 and a bracket 454 mounted on the beam 428. Similarly, tension springs 456 extend between the arms 434 and the bracket 458 mounted on the beam 424. The arms 436 and 438 have finger portions 460 and 462 projecting laterally inwardly from the lower end thereof which serves to underly the side flanges 404 of the roof beams 400.

In use, the roof beam biasing mechanism is initially positioned as shown in FIG. 18 of the drawings and the L-shaped stop plate 406 is position as shown in FIG. 12 of the drawings. The roof beams 400 are then inserted from the side of the trolley remote from the side rail 412 on which the stop plates 406 are located and extend into contact with the stop plates 406. Thereafter, the jacking cylinder 432 is activated to lift the entire assembly including the center portion of the roof beams 400 to locate the roof beams 400 in the position shown in solid lines in FIG. 9. After the side and end wall reinforcing panels have been inserted and the adhesive which is used to bond them to the side and end wall of the shell is cured, the roof beams are released. To release the roof beams the clamping cylinders 446 and 448 are activated to extend their associated pistons to cause the arms 436 and 438 to pivot about their pivotal connection with the beams 428. By moving one arm 436 all arms 436 are similtaneously moved by reason of their connection to the beam 440 and similarly by moving one arm 438, all arms 438 are moved by reason of their connection to the beam 442. This action causes the fingers 460 and 462 to move outwardly away from their underlying position with respect to the beam 400, thus releasing the beam 400 and permitting it to spring outwardly to bear against the bottom wall of the molded shell which will ultimately form the roof, to impart to it an outwardly convex curvature after the shell has been removed from the mold.

The inserter is transported into and out of the mold in use by an overhead transporter (not shown) from which it is suspended by means of chains 464 which are releaseably connected to the beams 334.

For the purposes of positioning an end wall reinforcing panel assembly 466 an end wall mounting frame 468 is provided. The end wall mounting frame 468 includes a central section 470 and a pair of side sections 472. The lower end portion 474 of the central section 472 is downwardly and inwardly curved to a hinge 476 mounted on a transverse support 478. The central section is movable between the inwardly toed position shown in solid lines in FIG. 14 and an upright position in which it will serve to locate the end wall reinforcing panel 446 in an upright position.

A support from the lower edge of the end wall reinforcing panel is provided in the form of a ledge 474 (FIG. 14) which is mounted on the side beams 412 and extends transversely therebetween.

The side sections 472 are hingedly connected to the central section 470 by means of hinges 476 for movement between an inwardly folded shown at the right hand side of FIG. 13 and a coplanar position shown at the left side of FIG. 13.

The centre section locating mechanism is generally identified by the reference numeral 478 and consists of a hand wheel 480 mounted on a shaft 482 which is rotatable in bearings 486. The bearings 486 are supported by beams 484 which extend from the cylinder support frame 336 to the upright 488. A lever arm 490 is mounted on each end of the shaft 482 and a rod 492 extends from each lever arm 490 and is pivotally mounted in a bracket 494 which is mounted on the central section 468.

By rotating the hand wheel 480 in the direction of the arrow 496, the central section locating mechanism 478 is operable to move the central section from the toed-in position shown in solid lines in FIG. 14 to an upright position shown in broken lines. To facilitate the application of the torque required to activate the hand wheel 480, a tubular extension 498 is provided which may be fitted over any one of the arms which project radially from the hand wheel 480.

The side section locating mechanism is generally identified by the reference numeral 500 and consists of a hand wheel 502 mounted on a shaft 504 which is rotatable in a bearing 506. The bearing 506 is supported on the beam members 334. A lever arm 508 is mounted on the shaft 504 for rotation therewith. A link arm 510 has one end pivotally connected to the lever arm 508. The other end 512 is bifurcated and pivotally connected to one end of a rod 514. The rod 514 is slidably mounted in an elongated bearing sleeve 516 which is mounted on the beam 334. A head portion 518 is threadedly mounted on the outer end of the shaft 514.

When the hand wheel 502 is rotated, the rod 514 can be moved between the retracted position shown at the right hand side of FIG. 13 and the extended position shown at the left hand side of FIG. 13.

With reference to FIG. 8 of the drawings, it will be seen that the side wall reinforcing panel 520 consists of a generally flat rectangular panel 522 which usually made from plywood and a plurality of stiffening ribs 524 which may also be made from wood. The ribs 524 are secured to the panel 522 by means of an adhesive or mounting screws or the like. A notch 526 is formed at the lower end of each rib 524. The end reinforcing panels are shown in cross-section in FIG. 13 and consist of a rectangular panel 528 which has large rectangular spacer panels 530 located on the outer face thereof.

Removal of Reinforced Molded Shell from Mold

The removal of the reinforced molded sheel and the mechanism for the use in removing the shell is illustrated in FIG. 16 and 17 of the drawings to which reference is now made. The reinforced molded shell is generally identified by the reference numeral 532 and as previously indicated, it consists of a glass fibre reinforced resin shell 316, side wall reinforcing panels 520, an end reinforcing panel 528 (FIG. 13) and roof beams 400.

The stripper mechanism 20 which is used for removing the reinforced molded shell 532 consists of two sets of clamps 534. Each set of claims 534 consists of a first clamp 536 and a second clamp 538 which are interconnected by a telescoping bridge rod assembly 540. The bridge rod assembly 540 consists of a tubular bar 538 in which a rod 541 is mounted to telescope. A centrally located suspension cable 542 supports a pair of diverging side cables 544 which extend to eyes 545 which are fixed to the first and second clamp 536 and 538. Each clamp 534 consists of a pair of oppositely disposed end plates 546 which are interconnected by shaft 548 and tube 552. Clamping arms 550a and 554a are mounted on and welded to the tube 552. Clamping arms 550b and 554b are pivotally mounted on the shaft 548 for movement toward and away from arms 550a and 554a.

Tubes 552 serve to space the arms 550a and 550b from the arms 554a and 554b respectively. An actuator level arm 556 is pivotally mounted at the lower end of the lever arm 554a and a pair of links 558 are connected to the actuator lever arm 556 at one end and to the lever arm 554b and the other end such that by moving the actuator lever arm 556 from the position shown in FIG. 17 in the direction of the arrow 560, the lower end of the lever arm 554b is moved toward the lower end of the fixed lever arm 554a to simultaneously cause the lower end of the clamping arm 550b to move toward the lower end of the clamping arm 550a. By reversing the direction of movement of the lever arm 556, the clamping arm 550b is returned to the open position. When the lver arm 556 moves in the direction of the arrow 560, the pivotal connection between the lever arm 556 and the links 558 will move to the centre line position 562 in which position it is below the pivot 564 and is therefore beyond a top dead centre position. The shoulders 566 which are located at the lower end of the arm 554a serve to limit the movement of the link arms 558 to a short distance beyond the top dead center position.

The clamping arms 550 have an upper set of clamping jaws 568 and a lower set of clamping jaws 570 which are arranged opposite one another.

In use, the clamps 534 are located so that the lever arms 554a and 554b are accessible from the interior of the reinforcing Panel 520 while the clamping arms 550a and 554b extend between the reinforcing panel 520 and the molded shell 532, one on either side of a rib 524. By moving the actuator lever 556 between the position shown in FIG. 17 and the position shown in FIG. 16, the clamping arm 550a and 554b are caused to clamp a rib 524 such that the jaws 568 and 570 will bite into the rib 524 to be secured thereto.

The hoist mechanism which may be in the form of a conventional chain hoist is then operatued to raise the suspension cables 542. When the suspension cable 542 is raised the force which is transmitted to the clamps 534 through the diverging side cables 544 tends to pull the clamps 534 inwardly and upwardly and this action facilitates the removal of the side walls of the shell from the mold and continued lifting causes the reinforced molded shell 532 to be removed from the mold 12.

Fitting of End Cap

As shown in FIGS. 19 and 20 of the drawings, after the reinforced molded shell 532 has been removed from the mold, the free end 572 is trimmed to the required length and a prefabricated end cap 574 is mounted thereon. As shown in FIG. 20 a layer of adhesive 576 is applied to the interior of the inner wall 578 of the end cap and the marginal edge of the end 572 of the shell and the adhesive 578 are sandwiched between the wall 578 of the end cap and a wooden insert 580 to secure the end cap 574 in position.

Transportation System

The transportation system used for transferring the reinforced molded shell 352 from any one of the molds 12 to the trimming station 22 is illustrated in FIGS. 21 and 22 of the drawings to which reference is now made. The transportation system includes an overhead rail system 24 which includes a first guide rail 582 located above and extending longitudinally of each mold 12. The first guide rails 582 extend over the full length of each mold 12 and project a substantial distance outwardly therefrom. Second guide rail segments 584 are spaced from one another and aligned in series to extend from adjacent the end of the guide rail 582 which extends from the mold 12 which is located furthest from the trimming station 22 to the trimming station 22. The guide rails 582 and 584 are in the form of I-beams along which wheeled support blocks 586 may run. Switch plate assemblies 588 and 590 are provided at the junctions between the rails 582 and 584.

A switch plate assembly 590 is illustrated in cross-section in FIG. 22. A switch plate assembly 590 consists of a support plate 592 which is mounted on a shaft 594 for rotation with the shaft 594. The shaft 594 is supported from an overhead support beam 596 for rotation in a bearing 598 about a verticalaxis 600. A drive motor 602 is drivingly connected to the plate 592 by means of a chain 604 and is operable to rotate the plate 592 as required in use. A first straight rail segment 606 is mounted on the underside of the support plate 592 and extends diametrically across the plate 592. A pair of curved segments 608 and 610 are also mounted on the underside of the support plate 592 and extend in an arcuate path to the perimeter of the support plate 592.

The switch plate 588 is the same as the switch plate 590 with the exception that there is no requirement for the curved segment 608.

In use the drive motor 602 can be activated to align the straight segment 606 with the second guide rail segments 584 or to align the curved segments 608 or 610 with the first guide rail segments 582 and 584 as required in use to provide for the passage lining inserter frame or the stripper mechanism along the guide rails into and out of the molds and to and from the molds and the trimming station as required in use.

Trimming Station

Figure 23:
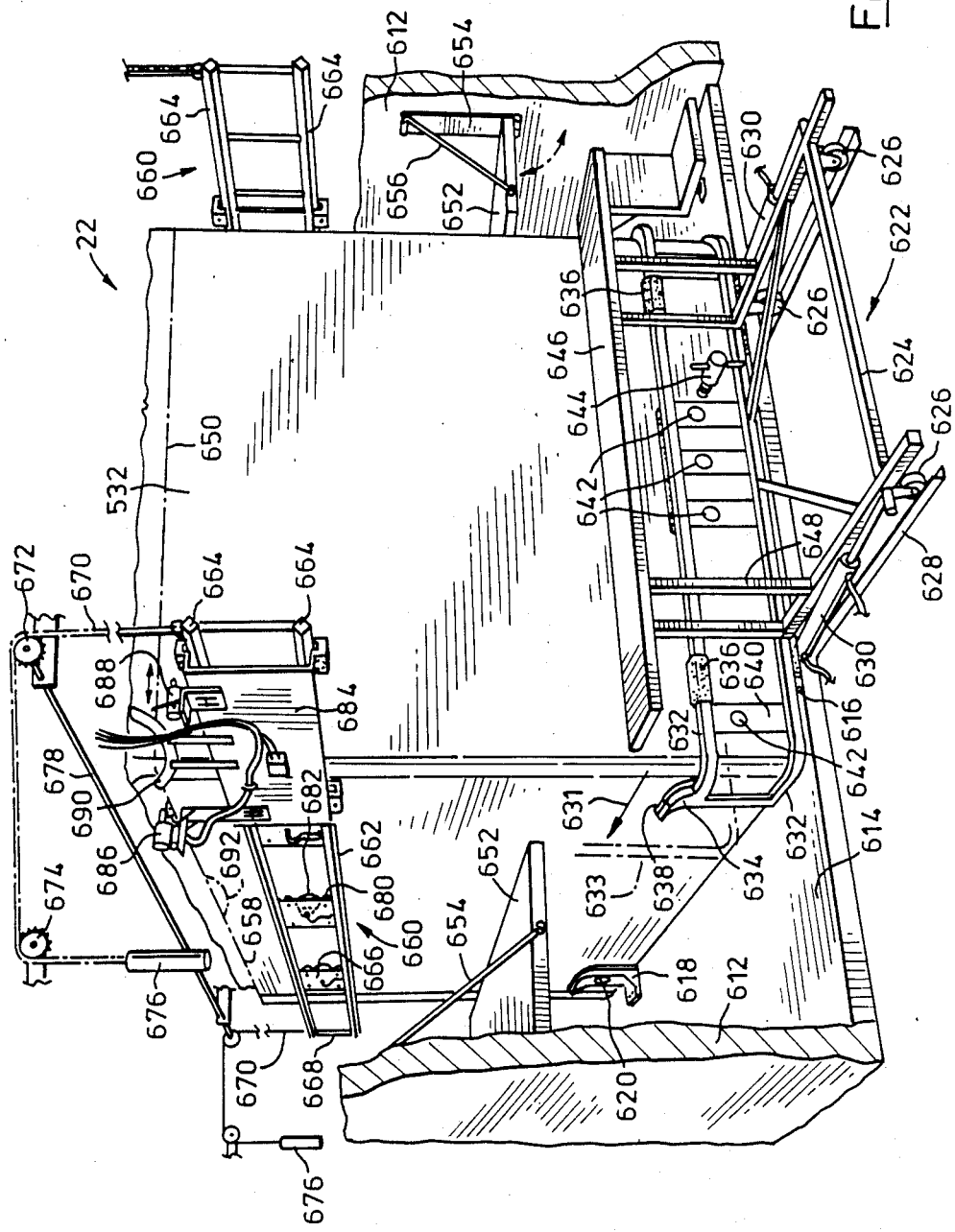
FIG. 23 is a pictorial view of a trimming station constructed in accordance with an embodiment of the present invention.

The trimming station will now be decribed with reference to FIG. 23 of the drawings.

The trimming station 22 is in the form of an enclosure having side walls 612 and a base 614. Slipway pads 616 (FIG. 24) are positioned on the base 614 to underlie the reinforced molded shell 532 and form a slipway upon which it can rest and along which it can be moved without damaging the exterior finish of the roof. Two drill jigs 618 (only one of which is shown) are arranged one on either side of the trimming station and have drill alignment passages 620 extending therethrough. A further drill jig 622 is in the form of a movable frame 624 which has wheels 626 which are guided along guide rails 628. Two double acting drive cylinders 630 have one end connected to the frame 624 and their other end connected to the base 614 such that by expanding and contracting the cylinder 630, the frame 624 can be caused to move from the position shown in solid lines in FIG. 23 to a position in which it will displace the closed end of the reinforced molded shell 532 in the direction of the arrow 631 to the position shown in broken lines at 633. The drill jig 622 has a pair of U-shaped frame members 632 which are shaped to receive the closed end of the reinforced molded 532 in a close but free fitting relationship. Guide arms 634 project upwardly and are flared outwardly from the ends of the upper U-shaped frame member 632. The inner face of each guide arm 634 is lined with a resilient pad 638. Bumper pads 636 are also positioned on the upper U-shaped frame member 632. A plurality of drill jig plates 640 each having a drill guide hole 642 extend between the rails 632 and are positioned at the required location of an opening to be formed in the molded shell 532 for the purposes of mounting light fixtures or the like. A conventional hand drill 644 is provided for the purposes of drilling the required holes through the drill hole guide passages 642.

A walk platform 646 is supported in a horizontal plane on support posts 648 which are an integral part of the movable frame 624. The walk platform 646 provides an elevated platform upon which an operator may stand when trimming the folded shell 532 along the trim line 650. Walk platforms 652 are hinged to support brackets 654 which are mounted on the side wall 612 and can be supported in the operable position by means of tie rods 656. The tie rods 656 can be released from the brackets 654 to permit the platforms 652 to fold downwardly to lie flat against the side wall 612 to provide increased clearance within the trimming station to facilitate the initial positioning of the reinforced molded shell 532.

For the purposes of trimming the molded shell 532 along the upper side cut lines 658, a side rail assembly 660 is provided at each side of the trimming station. Each side rail assembly 660 comprises a guide frame 662 which consists of a pair of spaced parallel guide rails 664 which are connected to one another by support plates 666 and tie bars 668. The guide frames 662 are suspended in the trimming station 22 on chains 670 which extend over sprockets 672 and 674 and have a counterweight 676 at the either end thereof. The counterweights 676 serve to counterbalance a sufficient proportion of the weight of the side rail assembly to permit the side rail assembly to be manually raised or lowered with each. The sprockets 672 are connected to one another by means of a shaft 678 which serves to maintain the horizontal alignment of the guide rails 664.

Stop pads 680 are positioned on the inner face of the support plates 666 and serve to bear against the side walls of the shell 532 to space the rails 664 outwardly therefrom in use. Vacuum cups 682 are mounted on each support plate 666 and are connected to a suitable vacuum source which can be activated as required to serve to secure the vacuum cup 682 with respect to the side walls of the mold and thereby firmly anchor the guide rails 640 in the position required for trimming. A slide 684 is slidably mounted on the guide rails 664 and supports the trimming tools and trimming aids which include a cutter 686, a drill 688 and a wheelwell templet 690.

By manually sliding the slide 684 along the length of the guide rails 664 when the cutter 686 is activated, the cutter 686 will cut the excess material away from the molded shell 532 along the cut line 658.

The slide 684 can also be positioned to locate the wheel well templet 690 in the required position to permit an operator to inscribe a line 692 along which a wheel well cut may be made by means of a manually held cutter.

Floor Mounting

A floor assembly 694 (FIG. 24) is preassembled in an assembly station which is remote from the trimming station and is transported to the trimming station by a suspension assembly 696 which is supported by a block and tackle 698 which is mounted on a wheeled carriage 700 which is freely movable along a guide rail 702 which extends normal to the guide rail 584.

As shown in FIG. 25 of the drawings, an end cap 523 in the form of a plastic extrusion is mounted on the upper edge of the panel 522 and has a flange 525 at its upper end. The end cap 523 extends about the upper edge of the panel 522 and the upper edge of the end panel 528.

The floor assembly 694 includes floor 704 and an angle bracket 706 which extends about the perimeter of the floor 704 and is secured thereto by means of mounting screws 708. The floor assembly 694 is positioned as shown in FIGS. 24 and 25 of the drawings so that it rests on the upper edge of the reinforcing support panels inwardly of the glass fibre resin reinforced shell 316. A bumper rail 710 is then positioned on the outer face of the shell 312 in alignment with the floor 704 and angle bracket 706. Drill holes are then formed in the bumber rails 710, shell 312 and angle bracket 706 and floor 704, using the drill 688 which is mounted on the slide 684 and mounting screws 712 are threaded into the drill holes thus formed to secure the floor 704 and bumper rails 710 with nespect to the shell 316.

After the floor assembly 694 has been positioned as described above, the suspension assembly 696 is released and returned to the floor assembly station to receive a further floor assembly.

Body Righting Mechanism

The body righting mechanism 26 will now be described with reference to FIGS. 24 to 31 of the drawings.

The body righting mechanism 26 consists of a pair of hoists 714 which are mounted on carriages 716 which are movable along the support rail 584. A chain 718 extends downwardly from each hoist and is connected to the upper end of an L-shaped support column 720. A beam 722 is mounted on a shaft 724 which is mounted for rotation in the lower end of each support column 720. The beam 722 functions as a rotor which rotates with the shaft 724 and has arms 726 projecting outwardly from the shaft 724. A brake disk 728 is mounted on one of the shafts 724 for rotation therewith. A brake pad assembly 730 is mounted on the support column 720 in an operable relationship with respect to the brake disk 728 and is operable to apply a braking torque to the brake disk 728 to lock the rotor in any required position.

A damper assembly 732 is provided for each rotor. The damper assembly includes a lever arm 734 mounted on each shaft 724 and projecting radially outwardly therefrom, a double acting hydraulic cylinder assembly 736 and a fluid reservoir 738. The conduit 740 has one end communicating with one end of the cylinder 736 and its other end communicating with the fluid reservoir 738. The conduit 742 has one end communicating with one end of the cylinder 736 and its other end communicating with the reservoir 738. The conduits 740 and 742 connect to opposite ends of the cylinder 736 on opposite sides of the piston which is mounted therein. The flow control valves 741 and 743 which are located in the conduits 740 and 742 can be independently adjusted to control the speed of rotation of the rotor and to achieve a uniform damping at the front and back end of the body to avoid twisting of the body when it is being righted. By restricting the flow of fluid from the cylinder 736, it is possible to limit the speed of rotation of the lever arm 734 and therefore the speed of rotation of the rotor assembly to prevent an excessive speed building up when the brake 730 is released to permit the body to turn right side up under the influence of its own weight.

For the purposes of securing the container body to the arms 726 of the rotor, mounting assemblies 744 and 746 are provided. Mounting assemblies 744 are constructed so as to be suitable for use in passages opening through the end wall of the body 532 and the mounting assemblies 746 are suitable for use in association with passages opening through the side walls of the body 532.

Figure 27:
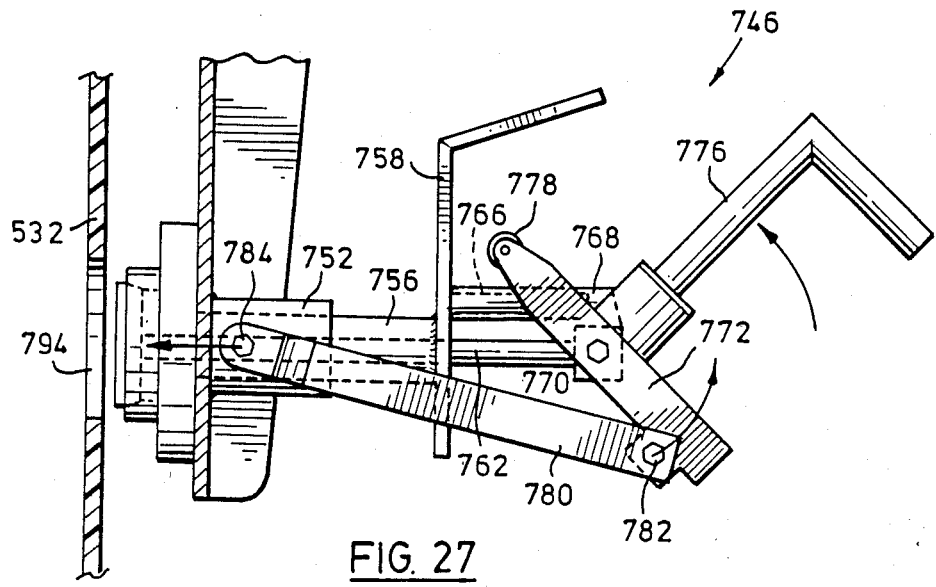
FIG. 27 is a side view of the mounting mechanism of FIG. 26 showing the mounting plug in its contracted configuration.
Figure 28:
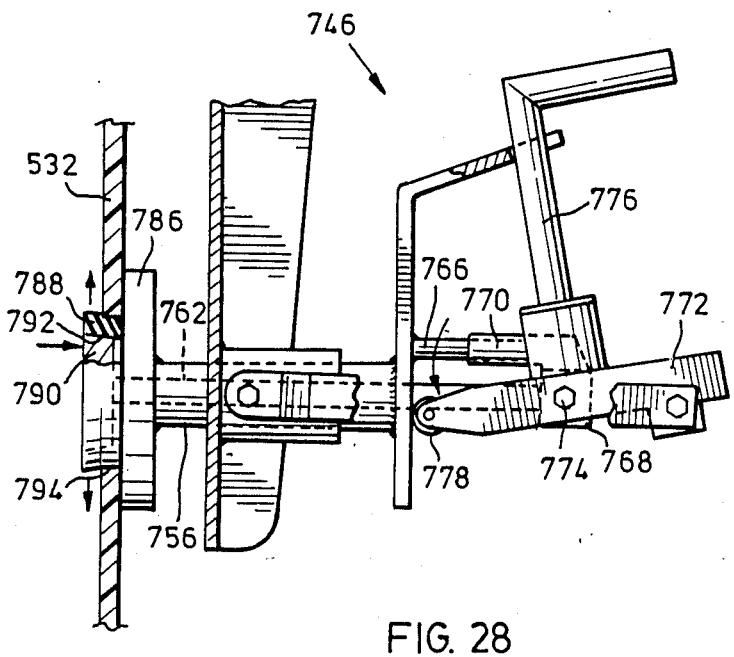
FIG. 28 is a side view of the mounting mechanism of FIG. 27 showing the mounting mechanism mounted in a passage formed in the body.

A mounting assembly 746 will now be described with reference to FIGS. 26, 27 and 28 of the drawings. The mounting assembly 746 is attached to the outer end portion 748 of the arm 726 by means of a mounting bracket 750. A boss 752 is mounted on the bracket 750 and has a bore 754 opening therethrough. A sleeve 756 is slidably mounted in the bore 754. An L-shaped bracket 758 is formed with a passage 760 through which a stem 762 extends. The bracket 758 is welded to the sleeve 756. A V-shaped notch 764 is formed at the outer end of the L-shaped bracket 758. An alignment pin 766 is welded onto the bracket 758 and projects outwardly therefrom. A guide block 768 is mounted at the outer end of the stem 762 and has a sleeve member 770 projecting therefrom in which the alignment pin 766 of the bracket 758 is slidably mounted to telescope therein. A rocker arm assembly 772 is pivotally mounted on a pivot pin 774 which is mounted in the guide block 768. An L-shaped lever arm 776 is mounted on a locker arm 772 and projects radially outwardly from the pivot pin 774. Rollers 778 are mountedat one end of the rocker arm 772 and a pair of link arms 780 have one end pivotally connected to the other end of the rocker arms 772 by means of a pivot pin 782. The other ends of the link arms 780 are pivotally connected to the boss 752 by means of a pivot pin 784.

The circular disk 786 is mounted at the other end of the sleeve 756 and a resilient annular collar 788 is mounted on the outer face of the disk 768. A tapered plug 790 is mounted at the outer end of the stem 762. The plug 790 has a side face 792 proportioned to fit in a close fitting relationship within the collar 788.

Figures 26, 31:
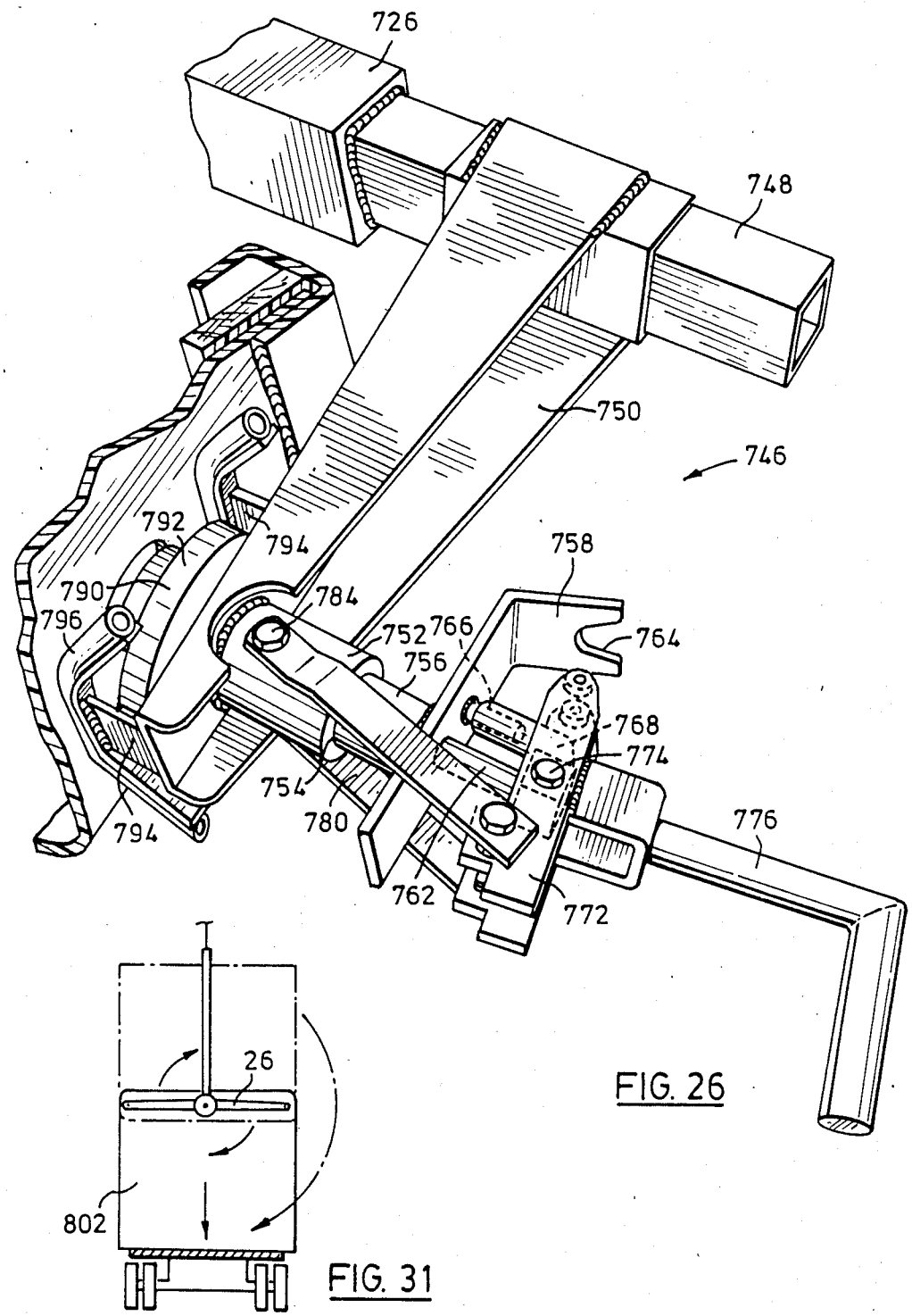
FIG. 26 is a pictorial view illustrating one of the mounting assemblies used for mounting the body onto the body righting mechanism.
FIG. 31 is a diagrammatic illustration of the rotation of the body from its upside-down position to a right-side-up position on the chassis of a vehicle.

When the mounting assembly 746 is located in the position shown in FIG. 26 of the drawings, the plug 792 is out of engagement with the collar 788 so that the diameter of the collar 788 is at a minimum and is proportioned to fit freely within the passage 794 formed in the shell 532. Movement of the lever arm 776 from the position shown in FIG. 26 through the position shown in FIG. 27 to the position shown in FIG. 28, causes the disk 786 to initially move toward the passage 794 to locate the sleeve 788 in the passage 794 and subsequently retracts the plug 790 into the collar 788 to cause the collar 788 to expand radially outwardly into engagement with the perimeter of the passage 794.

As shown in FIG. 26 of the drawings, spacer arms 794 are located one on either side of the plug 790 and project outwardly therefrom when the plug 790 is in its retracted position. Resilient bumper strips 796 are located on the outer faces of the arms 794.

Figure 29:
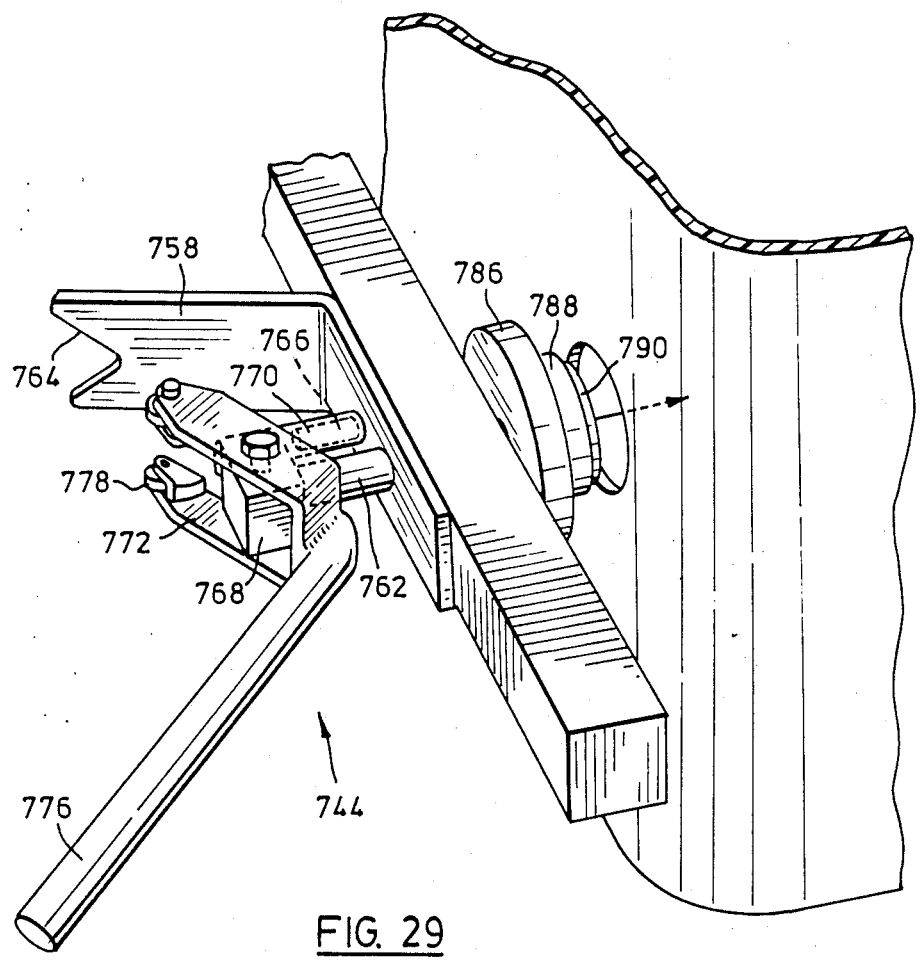
FIG. 29 is a pictorial view of the second type of mounting mechanism used for mounting the body to the body righting mechanism.

The mounting assemblies 744 illustrated in FIG. 29 of the drawings have a number of components which are identical to those of the mounting assembly 746 and are therefore identified by like numerals. Because it is not necessary to retract the disk 786, the assembly 744 does not include the sleeve 756, the boss 752 and the link arms 780.

Figure 30:
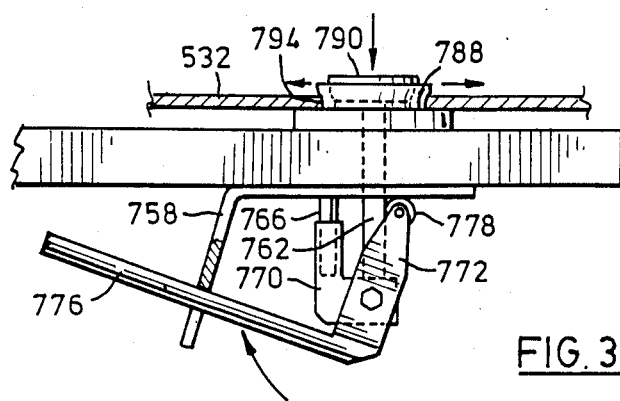
FIG. 30 is a side view of the mechanism of FIG. 29 showing the mounting mechanism mounted on a body.

By rotating the lever 776 between the position shown in FIG. 29 and the position shown in FIG. 30, it is possible to expand the collar 788 into the passage 794. When the handle 776 are in the positions shown in FIGS. 28 and 30, it will be noted that the rollers 778 are located on the opposite side of the stem 762 to the handle 776 with the result that the lever arms 776 are beyond a top dead center position and will remain locked in this position under the influence of the forces applied to the plug 790 which are tending to drive the plug outwardly of the collar 788.

When the body 800 (FIG. 31) has been completely assembled and mounted on the body righting mechanism 26, it is hoisted to be raised from the support pads 616 of the trimming station and is then moved out of the trimming station along the rail 584 to a position located above a chassis 802 (FIG. 31) onto which it is to be mounted. When it is located above the chassis 802, the brake 730 is released and the body 800 is allowed to rotate to a right
side up position and is then lowered onto the chassis 820 and secured thereto in a conventional manner.

Method of Operation

Air Circulation System

Before the spraying operation is initiated, the air circulation system is activated by activating the air extraction blower 60 and providing a fresh air supply through the discharge passages 62 so that air is circulated through each of the molds 12 as previously described.

Molding Operation

The mold 12 in which a shell is to be formed is prepared by masking off the portion of the surface of the mold to which the glass fibre reinforced resin is not to be applied using a conventional masking material such as craft paper or the like. A gel coat is then applied to the surface of the mold which is to be coated with the glass fibre reinforced resin.

The transfer trolly 16 is then positioned opposite the open end of the mold which is to be coated and the latching mechanism 80 is activated to align the guide rails 76 of the trolly 16 with the guide rails 35 of the mold as illustrated in FIG. 1a of the drawings. The operator then activates the motor 128 to move the carriage 120 off of the trolly 16 into the mold 12 to position the nozzle 222 in the plane in which spraying is to be initiated.

The motor 162 (FIG. 2) is then activated to cause the turntable 172 to travel back and forth about the arc illustrated in FIG. 6 of the drawings to thereby cause the nozzle 224 to follow the path of travel indicated by the broken line 221. Simultaneously, the motor 128 continues to be driven to move the workhead assembly 220 along the length of the mold so that as a result of successive passes, a layer of glass fibre reinforced resin is applied to the side and top walls of the mold and is compressed by the compression roller 226 to provide a compact layer. As previously indicated, the thickness of the layer which is deposited is determined by the speed of movement of the workhead with respect to the wall of the mold and this speed can be adjusted by providing nodes such as the nodes 254 on the cam plate 242. In addition, the length of the arc through which the workhead 220 is permitted to travel can be adjusted by adjusting the position of the pins 262 in the slots 260 (FIG. 5).

After the side walls and bottom wall of the mold have been coated, the motor 128 is reversed so as to move the bogey 126 away from the end wall 32. The motor 142 is then activated to rotate the frame 144 through 90° to direct the workhead 220 toward the end wall 32. Simultaneously, the shifter cylinder 284 (FIG. 5) is activated to move the switching block assembly 244 so that the roller 298 is aligned with the cam track 250. When the turntable is then activated to move the workhead with respect to the end wall 32, the movement of the turntable is restricted to that required to move the workhead 220 in the arc illustrated in FIG. 7 of the drawing.

It will be noted that a work platform 122 is provided on the carriage 120 and an operator works from the platform as the carriage moves along the mold 12 and is able to observe the quality of the work which is being performed by the applicator. The operator may have a manually operable roller available to him so that he can manually roll out some of the coating if there is any indication that such additional rolling is required. It may from time to time be necessary to undertake this type of manual rolling out to the portions of the mold adjacent the upper edge of the coating which is applied simply to prevent the thin upper edge from falling away from the wall of the mold.

After coating has been completed, the carriage 120 is withdrawn from the mold onto the transfer trolly 122 and the transfer trolly is uncoupled from the mold and is driven along the guide path 42 to the next mold which is to be coated and the foregoing process is repeated.

Preferably, the thickness of the coating which is applied is of the order of about 0.1 inches.

The shell which is formed is then allowed to cure. A curing time of about forty minutes is usually required to ensure that the shell is sufficiently cured to permit mounting of the reinforcing liners on the walls of the shell.

The liner inserter is initially set up as shown in FIG. 8 of the drawings with the wheels 382 in the lowered position and the side and end support frames toed inwardly. The side wall reinforcing panel 520 and end wall reinforcing panel 66 are mounted as previously described and the roof beams 400 are inserted and arched upwardly as previously described. The wheeled bogey 324 is then wheeled to a position aligned with the open end of the mold into which the liners are to be inserted and it is then raised by an overhead block and tackle mounted on the rail 582 above the mold in which the inserter is to be located. The wheels 382 are then retracted by operating the crank handle 392. A suitable adhesive is applied to the outer face of the reinforcing ribs 524 and the entire assembly is operably positioned in the shell which is to be reinforced. The cylinders 346 (FIG. 9) are then activated to move the side frames 326 outwardly to press the side wall reinforcing panels 520 into engagement with the molded shell. The roof beam biasing mechanism 420 is activated, after the side wall and end wall reinforcing liners are securely bonded to the side and end walls, to release the roof beams 420 to permit them to move into engagement with the bottom wall of the molded shell. The roof beams 420 are also preferably coated with a suitable adhesive so that they will be bonded to the bottom wall of the shell. Preferably, the roof beams 400 will assume an outwardly convex configuration when the shell is removed from the mold. As previously indicated, before the side wall reinforcing panels are positioned on the support frames 326, the pressure pads 354 are moved to their retracted position. After the side wall reinforcing panels 520 have been positioned against the side walls of the shell, the pressure pads 354 are released to move into engagement with the side wall reinforcing panels 342 to press them against the shell.

The end wall reinforcing panel 466 is then operably positioned against the end wall by moving the central section 470 outwardly toward its upright position by activating the hand wheel 480 and thereafter the side sections 472 are pivoted outwardly to bear against the end wall panel 466 by operating the hand wheels 502.

The lining inserter is retained in the mold for a period of time sufficient to permit the adhesive to be effective to secure the reinforcing liners to the shell. Generally, no more than a few minutes is required for this curing of the adhesive to take place. Thereafter, the end and side support frames are collapsed to their inwardly toed position and the frame is hoisted and removed from the mold, the wheels are lowered and the frame can then be released from the hoist and wheeled to a workstation in which the next set of side and end reinforcing panels and roof beams are operably located thereon.

The next step in the manufacturing procedure is to removed the reinforced molded shell 532 from the mold and this is achieved by the mold extractor 20 as previously described. The clamps 534 are attached to the ribs 524 and the assembly is hoisted out of the mold, as illustrated in FIG. 16 of the drawings. This assembly is then transported from the mold 12 in which it is formed along the guide rail 582 to the guide rail 584 and into the trimming station 22. In the trimming station 22, the shell is trimmed as previously described with the aid of the side rail assembly 660 and the various drill holes are formed in the positions dictated by the various drill jig passages which are provided.

The floor assembly is then mounted in the open end of the trimmed body and is secured thereto as illustrated in FIGS. 24 and 25 of the drawings.

Thereafter, the body righting mechanism is mounted on the body and the body is transported out of the trimming station to a body righting station in which it is turned right-side-up and positioned on the chassis of a vehicle as illustrated in FIG. 31.

From the foregoing it will be apparent that the present invention provides a complete method and apparatus for use in the manufacture of unitary glass fibre reinforced plastic container bodies which is capable of operating at high speed and with a low manual labour input requirement.

It has been found that one applicator 14 can operate at a sufficiently high speed to coat up to seven molds without occupying more than 90% of the operating capacity of the applicator. It will of course be understood that the number of molds which can be utilized without employing more than 100% of the work capability of the applicator is a function of the size of the molds.

Various modifications of the present invention will be apparent to those skilled in the art.

For example it will be apparent that the movement of the applicator required to form a coating on the walls of the mold may be achieved by mounting the spray head and roller on an arm of a programmable industrial robot which may be transported along the mold on a carriage similar to the carriage 120.

In addition it will be apparent that the floor assembly can be mounted on the body after it has been turned right side up.

These and other variations and modifications of the present invention will be apparent to those skilled in the art.

We claim:

1. A body manufacturing system for manufacturing bodies for vans, trainers, trucks comprising:
    (a) a molding station having a plurality of molds each of which has a bottom face, a pair of oppositely disposed side faces and an end face, each mold having an open top and an open front end, the molds being arranged in a side-by-side relationship with their open front ends disposed toward a guide path which extends transversely thereof,
    (b) a glass fibre applicator adapted to apply a layer of compacted glass fibre and resin to the bottom side and end faces of one of said molds to form a glass fibre shell,
    (c) longitudinal guide means associated with each mold for guiding the glass fibre applicator along the length of each mold as said applicator applies the required layer to form said shell,
    (d) transfer means for supporting and transporting said applicator along said guide path from one mold to another,
    (e) liner inserter and roof beam locater means for inserting an end wall liner, a pair of side wall liners, and a plurality of roof beams simultaneously into a mold in which said shell has been formed, and for pressing said liners against end and side faces, respectively, of said shell and said roof beams against a face of said shell formed against the bottom face of the mold, such that said liners and said roof beams may be secured to said shell,
    (f) extraction means for extracting the body from the mold in which said body is formed,
    (g) righting means for supporting said body and for turning said body right side up for mounting on a chasis of a vehicle.

2. A body manufacturing system as claimed in claim 1 further comprising;
    (a) a trimmning station remote from said molding station,
    (b) transporter means for transporting said bodies from the molding station in which said bodies are formed to said trimming station,
    (c) trimming means in said trimming station for trimming said body to the required proportions and contour,
    (d) floor mounting means for mounting a floor in the upwardly open end of the body located in said trimming station to form a finished body,
    (e) said righting means being adapted to remove the finished body from the trimming station before said finsined body is turned right side up for mounting on a chasis of a vehicle.

3. A body manufacturing system as claimed in claim 1 wherein said transfer means is in the form of a transfer trolley, said transfer trolley being mounted for movement along said guide track to be aligned with the open end of any one of said molds, said manufacturing system further comprising;
    (a) a carriage supporting said applicator for movement onto and off of said transfer trolley and along each mold as required,
    (b) a power supply at one end of said guide track, (c) power supply cable means having a first end held fast with respect to the power supply and a second end mounted on said carriage for movement therewith, said power supply cable also being held fast with respect to the transfer trolley at a point intermediate the ends thereof, said power supply cable having a first length extending from said first end to said point sufficient to extend to the trolley when said trolley is located at the mold which is most distant from the power supply and a second length extending from said point to said second end which is sufficient to permit said carriage to be located in an operable position adjacent the end face of any of said molds, (d) take-up means located at said one end of said guide track and engaging said first length of said cable to take up or deploy the slack in said first length as said trolley moves toward and away from said one end of said track.

4. A body manufacturing system as claimed in claim 1 wherein said transfer means is in the form of a transfer trolley mounted for movement along said guide track to be aligned with the open end of any one of said molds, said manufacturing system further comprising;

(a) a canopy for each mold, each canopy extending over and closing the open top of its associated mold, each canopy having an open front end aligned with the open end of its associated mold and an air extraction outlet at the other end thereof proximate the end wall of its associated mold, extraction means communicating with each extraction outlet for extracting air therethrough, and, (b) fresh air supply means having outlets disposed opposite the open front end of each mold for directing a stream of fresh air into the front end of each mold to provide a supply of fresh air to replace the contaminated air which is withdrawn by the extraction means in use.

5. A body manufacturing system as claimed in claim 1 wherein the glass fibre applicator comprises a work head which is operable to apply a layer of glass fibre and resin as aforesaid further comprising;

a guidance system for guiding said work head along a predetermined path comprising;

a U-shaped guide track extending in a first plane, a turntable mounted for rotation about a first axis which extends perpendicular to said first plane and is located equidistant from each side of the U-shaped guide track, a track follower mounted in said track, a first slide member slidably mounted on said turntable for movement with respect to said turntable in a first radial direction with respect to said first axis, a second slide member slidably mounted on said turntable for radial movement with respect to said first axis in a direction opposite said first direction, said work head being mounted on said second slide member for movement therewith, and power transmission means for driving said track follower and said slide mexbers whereby the second slide member is the slave of the track follower, said power transmission means comprising;

(a) a drive chain having portions of its length coextensive with, and mounted for movement along, said U-shaped guide track, (b) a sprocket mounted for rotation at each corner of the U-shaped guide track, said sprockets engaging and guiding said chain around said corners, (c) said track follower comprising a follower roller mounted on said drive chain for movement along said guide track with said chain, (d) drive means drivingly connected tosaid drive chain for driving said chain to and fro along said track, (e) said first slide member being secured to said follower for movement therewith along said U-shaped guide track to effect radial movement of said first slide member with respect to said turntable, (f) a first rack member mounted on said slide member for movement therewith, .

(g) a pinion member mounted for rotation on said turntable, said pinion member having a first pinion gear portion meshed with said first rack and a larger second gear portion, said first and second gear portions having a gear ratio which is proportional to the ratio of the proportions of the guide track to the proportions of said predetermined path, a second rack member mounted on said second slide member and meshed with said second gear to drive said second slide member in response to rotation of said turntable as aforesaid.

6. A body manufacturing system as claimed in claim 1 wherein the glass fibre applicator comprises a work head which is operable to apply a layer of glass fibre and resin as aforesaid further comprising;

a guidance system for guiding said a work head along a predetermined path having;

a frame, a U-shaped guide track on said frame and extending in a first plane, a turntable mounted for rotation about a first axis which extends perpendicular to said first plane and is located equidistant from each side of the U-shaped guide track, a track follower mounted in said track, a first slide member slidably mounted on said turntable for movement with respect to said turntable in a first radial direction with respect to said first axis, a second slide member slidably mounted on said turntable for radial movement with respect to said first axis in a direction opposite said first direction, a work head mounted on said second slide member for movement therewith, and power transmission means for driving said track follower and said slide members whereby the second slide member is the slave of the track follower, wherein the power transmission means comprises;

(a) a drive chain having portions of its length coextensive with, and mounted for movement along, said U-shaped guide track, (b) a sprocket mounted for rotation at each corner of the U-shaped guide track, said sprockets engaging and guiding said chain around said corners, (c) said track follower comprising a follower roller mounted on said drive chain for movement along said guide track with said chain, (d) a variable speed reversible drive motor mounted on said frame and having a drive sprocket drivingly engaging said drive chain and control means for controlling the direction of rotation and speed of operation of said drive motor to control the direction of rotation and speed of operation of said work head.

7. A body manufacturing system as claimed in claim 1 further comprising:
   (a) a trimming station remote from said molding station,
   (b) an overhead rail system for use in transporting a molded body from any one of said molds to said trimming station comprising,
      (i) a first guide rail located above and extending longitudinally of each mold, each first guide rail having an outer end located outwardly from the open front end of its associated mold,
      (ii) a second guide rail comprising a plurality of serially arranged segments, the first of which extends from the trimming station to a first transfer point adjacent the outer end of a first of said guide rails and successive segments extending from said first transfer point to successive transfer points adjacent the outer ends of adjacent first guide rails with the last segment being connected directly to the last first guide rail, and,
      (iii) switching means at each transfer point which is operable to connect successive segments of said first guide rail to one another or to the outer end of an adjacent first guide rail whereby any one of said first guide rails may be connected to the first segments of the second guide rail.

8. A body manufacturing system as claimed in claim 1 wherein said liner inserter and roof beam locater means comprises;
   (a) a bottom wall, a pair of oppositely disposed side walls pivotally mounted on and extending upwardly from opposite sides of said bottom wall, a front wall pivotally mounted on and extending upwardly from the front end of said bottom wall, said end and side walls being adapted to support end and side panels outwardly therefrom in a face-to-face relationship and beam support means on said bottom wall for supporting a plurality of roof beams,
   (b) first jacking means connected to said frame and said side walls and second jacking means connected to said frame and said end wall, said first and second jacking means being operable to cause said side and end walls to pivot between and inwardly inclined position in which side and end wall panels located thereon are toes inwardly to facilitate entry of the inserter into a mold and an upright position in which the side and end panels of the liner may be located in a face-to-face relationship with the side and end faces of a molded shell located in a mold, and roof beam biasing means on said bottom wall for engaging said roof beams intermediate their ends to initially bias the roof beams inwardly, said roof beam biasing means being releaseable from a roof beam to permit the roof beam to move into intimate contact with the underlying shell portion.

9. A body manufacturing system as claimed in claim 8 wherein said end wall of said liner inserter comprises a central portion and a pair of end segments pivotally mounted on the central portion for movement between a position in which they extend inwardly from the central portion thereby to permit the end wall to be located between the inwardly toes side walls when the end wall is in its inwardly toes position and a second position in which the said segments are substantially coplanar with the central portion.

10. A body manufacturing system as claimed in claim 8 wherein a plurality of spring loaded pressure pads are mounted on an outer face of each side and end wall to bear against a side and end panel in use, said pressure pads being spring loaded so as to yield under the influence of the first and second jacking means to absorb a portion of the load applied by the jacking means when driving the sided end walls outwardly toward the sided end walls of the mold.

11. A body manufacturing system as claimed in claim 1 wherein said extraction means for extracting the body fromthe mold comprises;
   (a) first and second clamp means disposed opposite one another and adapted to be releasably secured to the exposed upper edge portions of the side panels of a liner of a body mounted in the mold,
   (b) bridge means extending between said oppositely disposed clamp means, said bridge means being adapted to telescope to permit movement of said oppositely disposed clamping means toward one another,
   (c) suspension means for suspending said bridge means comprising;
      a centrally located suspension cable and a pair of diverging side cables extending irom the central cable one to each oppositely disposed clamp means, and hoist means for raising the central cable and transmit an inwardly and upwardly directed force to each clamp means tending to draw the side walls upwardly and inwardly toward one another, to telescope the bridge member and separate the side walls of the body from the mold to facilitate removal of the body from the mold.

12. A body manufacturing system as claimed in claim 1 in which an oversized glass fibre reinforced plastic shell is formed in each of said molds and is lined with a rigidifying liner, further comprising;
   (a) a trimming station remote from the mold in which the body is fomred comprising;
   (b) a side rail assembly extending longitudinally of the trimming station,
   (c) support means for supporting said side rail assembly so that it may be raised or lowered with respect to the side wall of a body located in an upside-down position in said trimming station,
   (d) clamping means on said support means for releaseably securing said support means to the side wall of a body located in said trimming station,
   (e) slide means slidably mounted on said support means for longitudinal movement along said support means and cutter means mounted on said slide member for movement therewith to cut the side walls of said shell as the slide member moves along the support means to remove excess material from the shell.

13. A body manufacturing system as claimed in claim 12 wherein a wheel well templet is mounted on said slide member for movement with said slide member along the support means to the required location of the wheel well on the body for use in inscribing the wheel well outline on the side of the body.

14. A body manufacturing system as claimed in claim 12 further comprising; elevated walkway means in said trimming station extending along each side thereof adjacent the sides of the body located therein in use to provide ease of access to a slide member in use.

15. A body manufacturing system as claimed in claim 13, further comprising;
slipway means in said trimming station arranged to underlie and extend longitudinally of said station for slidably supporting a body for longitudinal movement in said station in use.

16. A body manufacturing system as claimed in claim 14, further comprising;
a drilling jig extending transversely of one end of said trimming station, said drilling jig having a plurality of drill hole passages opening therethrough and means for moving the drill jig longitudinally with respect to said trimming station so as to longitudinally displace a body located therein to space the body from the drilling jig after drilling has been completed to facilitate the removal of the body from the trimming station.

17. A body manufacturing system as claimed in claim 1 for use in manufacturing bodies for vans, trailers, trucks wherein the body is oriented so as to be upside down when its manufacture has been substantially completed, and wherein said righting means further comprises;
a body righting mechanism for turning the body right-side-up comprising;
(a) hoist means which is operable to be raised or lowered as required,
(b) a pair of support columns suspended from said hoist means in a spaced relationship for movement with said hoist means,
(c) rotor means mounted for rotation on each support means about a common axis, each rotor means being adapted to be secured to opposite ends of a body below the centre of gravity of the body,
(d) damper means communicating with each rotor means for controlling the rate at which each rotor means may rotate,
(e) brake means at at least one of said rotor means for releaseably securing said one rotor means against rotation,
(f) said hoist means being operable to lift and locate an upside down body in a righting station and said brake means being releaseable to permit the rotor means to rotate about said common axis to right said body and said damper means being operable to slow the rotation of the rotor means to provide for the controlled rotation of the body in said righting station as it is righted.

18. A body manufacturing system as claimed in claim 17, wherein each rotor means comprises an elongated arm which projects radially from opposite sides of said common axis and has outer ends spaced a substantial distance from said common axis and wherein mounting means is provided at the outer end of each arm, said mounting means being adapted to engage in sockets formed in said body to secure said rotors which respect to said body.

19. A body manufacturing system as claimed in claim 18, wherein said mounting means each comprise an expandable plug and means for expanding and contracting said plug to fit within and be releaseable from said sockets.

* * * * *